(12) United States Patent
Skoler

(10) Patent No.: US 10,460,333 B2
(45) Date of Patent: Oct. 29, 2019

(54) METHOD AND SYSTEM FOR AUTOMATED TARGETED POLLING VIA AN E-COMMERCE PROMOTIONS PLATFORM

(71) Applicant: TRANSFORM SR BRANDS LLC, Hoffman Estates, IL (US)

(72) Inventor: Frederick W. Skoler, Barrington, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 14/444,457

(22) Filed: Jul. 28, 2014

(65) Prior Publication Data

US 2014/0337102 A1 Nov. 13, 2014

Related U.S. Application Data

(63) Continuation-in-part of application No. 13/956,978, filed on Aug. 1, 2013, and a continuation-in-part of application No. 14/321,450, filed on Jul. 1, 2014.

(60) Provisional application No. 61/678,547, filed on Aug. 1, 2012, provisional application No. 61/842,353, filed on Jul. 2, 2013.

(51) Int. Cl.
*G06Q 30/00* (2012.01)
*G06Q 30/02* (2012.01)
*G07F 17/32* (2006.01)

(52) U.S. Cl.
CPC ....... *G06Q 30/0203* (2013.01); *G07F 17/323* (2013.01); *G07F 17/329* (2013.01); *G07F 17/3239* (2013.01)

(58) Field of Classification Search
CPC .................................................. G06Q 30/0203
See application file for complete search history.

(56) References Cited

U.S. PATENT DOCUMENTS

| 5,983,196 | A | * | 11/1999 | Wendkos | G06Q 10/0633 |
| | | | | | 705/14.14 |
| 6,546,555 | B1 | * | 4/2003 | Hjelsvold | H04N 21/21 |
| | | | | | 348/E5.008 |
| 2002/0077903 | A1 | * | 6/2002 | Feldman | G06Q 30/02 |
| | | | | | 705/14.15 |
| 2004/0030598 | A1 | * | 2/2004 | Boal | G06Q 30/02 |
| | | | | | 705/14.25 |
| 2005/0216429 | A1 | * | 9/2005 | Hertz | G06Q 10/06 |
| 2008/0085675 | A1 | * | 4/2008 | Rao | 455/2.01 |
| 2008/0103877 | A1 | * | 5/2008 | Gerken | G06Q 30/02 |
| | | | | | 705/7.32 |

(Continued)

OTHER PUBLICATIONS

Canadian Intellectual Property Office, Examiner's Requisition in Application No. 2,898,218 dated Nov. 1, 2016 (5 pages).

(Continued)

*Primary Examiner* — Bennett M Sigmond
*Assistant Examiner* — Scott C Anderson
(74) *Attorney, Agent, or Firm* — McAndrews, Held & Malloy, Ltd.

(57) ABSTRACT

Certain embodiments of the disclosure relate to methods and systems that support automated, targeted polling of consumers via an e-commerce promotions platform for administering e-commerce promotional activities, such as, for example, sweepstakes, contests, giveaways, and/or instant wins.

27 Claims, 16 Drawing Sheets

(56) References Cited

U.S. PATENT DOCUMENTS

2012/0166457 A1* 6/2012 Ross ................ G06F 17/30616
 707/755

OTHER PUBLICATIONS

Mexican Patent Office, Office action in Application No. MX/a/2015/009659 dated Nov. 28, 2018 (4 pages).

* cited by examiner

| Sweeps Name: | Bike Month Bike Giveaway |
|---|---|
| Sweeps Start Date: | 05/13/2014 01:15 PM |
| Sweeps End Date: | 05/31/2014 11:59 PM |
| Total # of entries | 4550 |
| Total # of unique entrants | 2993 |

Fig. 10

| SYW_ID | Question Text | Answer option(s) selected |
|---|---|---|
| 42 | What is the reason you bike the most? | Commute |
| 42 | What do you look for the most in a helmet purchase? | Cost |
| 42 | How often do you bike? | Never |
| 42 | What is your typical biking distance? | Around the block |
| 42 | What type of bike do you prefer to ride? | 26" Mountain |

Fig. 11

METHOD AND SYSTEM FOR AUTOMATED TARGETED POLLING VIA AN E-COMMERCE PROMOTIONS PLATFORM

CROSS-REFERENCE TO RELATED APPLICATIONS/INCORPORATION BY REFERENCE

The present application is a continuation-in-part of co-pending U.S. patent application Ser. No. 13/956,978, entitled "Contests and Sweepstakes," filed Aug. 1, 2013, which claims benefit of and priority to U.S. Provisional Patent Application No. 61/678,547, entitled "Contests and Sweepstakes," filed Aug. 1, 2012; and is a continuation-in-part of co-pending U.S. patent application Ser. No. 14/321,450, entitled "Methods and Systems for an E-Commerce Promotions Platform," filed Jul. 1, 2014, which claims benefit of and priority to U.S. Provisional Patent Application No. 61/842,353, entitled "Methods and Systems for an E-Commerce Promotions Platform," filed Jul. 2, 2013.

The complete subject matter of each of the above are hereby incorporated herein by reference, in their respective entireties.

FIELD

Certain embodiments of the disclosure relate to e-commerce platforms and e-commerce platform implementation tools. More specifically, certain embodiments of the disclosure relate to methods and systems that support automated, targeted polling of consumers via an e-commerce promotions platform for administering e-commerce promotions, such as, for example, sweepstakes, contests, giveaways, and/or instant wins.

BACKGROUND

Various organizations use polling as a means to gather information about a wide variety of questions and topics. Individuals to be polled may be selected from various lists (e.g., mailing lists, membership lists, voter records, government tax records) and may be polled using electronic (e.g., email, telephone), conventional paper mail, or face-to-face approaches. Typical techniques of polling consumers are costly and time consuming, and require that the polling entity contact the individual(s) to be polled via one of the above means. Conventional approaches are typically intrusive, particularly if the sponsor of the poll wishes to have poll results for a narrowly defined demographic, due to the need to carefully qualify the potential respondents.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method supporting automated, targeted polling of consumers via an e-commerce promotions platform for administering e-commerce promotions, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 7 is an illustration of a screen image showing another example poll creation pop-up window, in accordance with the present disclosure.

FIG. 8 illustrates an example chart of analytics information showing two rows of information for two promotional activities, in accordance with the present disclosure.

FIG. 9 is an illustration of an example chart showing information for a poll question, in accordance with the present disclosure.

FIG. 10 is an illustration of an example table showing information about a sweepstakes type promotional activity, in accordance with the present disclosure.

FIG. 11 is an illustration of an example chart showing the questions presented to a poll participant and the corresponding responses, including a participant identifier, in accordance with the present disclosure.

DETAILED DESCRIPTION

Figure 1:
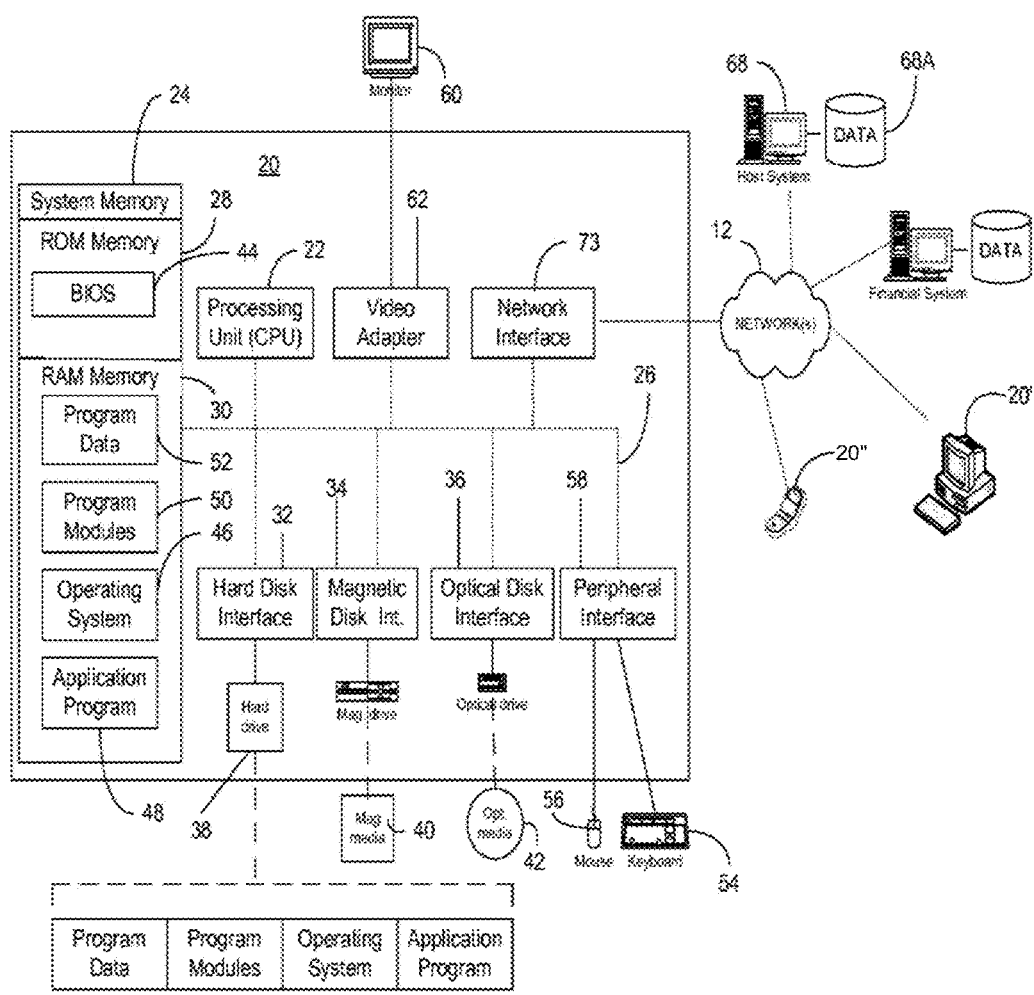
FIG. 1 is an illustration of an exemplary computer network in which a representative embodiment of the present disclosure may be practiced.

Certain embodiments of the disclosure relate to e-commerce platforms and e-commerce platform implementation tools. More specifically, certain embodiments of the disclosure relate to methods and systems that support automated, targeted polling of consumers via an e-commerce promotions platform for administering e-commerce promotions, such as, for example, sweepstakes, contests, giveaways, and/or instant wins.

In accordance with an example embodiment of the disclosure, an administration tool (herein referred to as an "Awesome Tool", an "Administration Tool", an "AT," or a "campaign management tool") may be provided for administering e-commerce promotions, such as sweepstakes, contests, giveaways, and/or instant wins. The Administration Tool may provide a novel production flow enabling the automation of sweepstakes, contests, giveaways, and/or instant wins with complex social interaction and the associated legal rules development for these promotions. Such an administration tool may include functionality that supports the automated identification and targeted polling of consumers as part of process of qualifying for and/or participating in e-commerce promotional activities such as, for example, sweepstakes, contests, giveaways, and/or instant wins.

The terms "user," "end-user," "customer," and "consumer" may be used herein to refer to a potential or existing purchaser of products and/or services of a business or merchant.

The term "e-commerce" may be used herein to refer to business or commerce that is transacted electronically, as over the Internet. The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The term "social network" may be used herein to refer to a network of family, friends, colleagues, and other personal contacts, or to an online community of such individuals who use a website or other technologies to communicate with each other, share information, resources, etc. The term "social graph" may be used herein to refer to a representation of the personal relationships or connections between individuals in a population. The term "social signal" may be used herein to refer to an expression by a user of a relationship with or feeling about a person, product, or thing. In the context of the present disclosure, the terms "social signal" and "social signal information" refer to a relationship with or feeling about a product.

The terms "like," "want," "have" or "own," and "recommend" may be used to refer to particular social signals that may be represented on a web page in association with a product, and may be selected by a consumer to represent their relationship with or feeling about the product.

The term "channel" in the present context may refer to various means of communicating such as, for example, online communication (e.g., Internet-based), mobile communication (e.g., wireless communication such as cellular or Wi-Fi), telephone communication, and in-store communication.

The terms "merchant" and "sponsoring merchant/merchants." may be used herein to refer to the owner and/or operator of a business enterprise that either operates an e-commerce promotions platform system as described herein, or enters into an agreement with another to operate or provide services of such an e-commerce promotions platform on their behalf.

The term "poll sponsor" may be used here to refer to an individual or entity that arranges for the polling of the users of an e-commerce platform in accordance with the present disclosure.

The term "loyalty program" may be used herein to refer to a structured marketing effort that rewards, and therefore encourages, loyal buying behavior that is potentially beneficial to the business or firm operating or sponsoring the loyalty program. The term "member" may be used herein to refer to those consumers that have provided personal information to an operator or sponsor of a loyalty program in order to gain access to benefits provided by the loyalty program.

The term "follow" may be used herein to refer to a user request to be kept informed about a particular person, place, or thing.

The term "share" may be used herein to refer to a user request to communicate information about what is being viewed by a user to members of the user's family, friends, or social network.

The term "campaign" may be used herein to refer to an action, or a series of actions taken to accomplish a particular purpose or goal. In the context of the present disclosure, the term "campaign" may be used herein to more specifically refer to the one or more actions taken to put into place, engage consumer participants in, and operate one or more of a contest, a sweepstake, a giveaway, or an instant win.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

As utilized herein, the terms "exemplary" or "example" means serving as a non-limiting example, instance, or illustration. As utilized herein, the term "e.g." introduces a list of one or more non-limiting examples, instances, or illustrations.

Some representative embodiments of the present disclosure may have an integrated social media functionality that allows consumers to communicate product, service, manufacturing, sales, and other information with others, and to search for products of interest, poll friends, family, and others, recommend products and receive product recommendations, and plan for and participate in events in their lives and the lives of others.

A representative embodiment of the present disclosure may employ an automated process for inserting targeted questions into a high volume assembly of active promotions and receive data after a defined term of engagement. In some representative embodiments, such automated polling may be performed by a first party operating a promotions platform, for a second party, for a fee.

An individual, corporate or non-profit entity, or other customer wishing to perform a poll of a population of individuals may gain access to a representative embodiment of the present disclosure via, for example, a web site on the Internet or other communication network. The web site may act as a portal for accessing a tool for managing an e-commerce promotions platform used to create, schedule, and manage e-commerce promotional activities such as, by way of example and not limitation, contests, sweepstakes, giveaways, and instant wins. In some representative embodiment of the disclosure, the participants in the promotional activities may be members of a loyalty program of a merchant or sponsor of the promotions platform, which may have access to personal information about, by way of example and not limitation, the interests, preferences, purchase history, social network, and other aspects of the participants.

The promotions platform may include a means to access functionality that permits the prospective poll sponsor/customer of the promotions platform to specify one or more questions to be used for polling, and to associate one or more tags with each of the questions. A representative embodiment of the present disclosure may permit the customer of the promotions platform to search for appropriate "tags" using keywords or categories related to the products or subjects with which the questions for the poll may be related or associated.

The promotions platform may have a number of promotional activities that are active/live or scheduled, and a representative embodiment of the present invention may identify, to the customer of the promotions platform, how many promotional activities are available that are suitable for polling, and how many may be related to the categories and/or tags identified by the customer of the platform. For the purposes of this disclosure, a suitable promotional activity may be one that involves polling as a part of qualification for, or participation in a promotional activity. A representative embodiment of the present disclosure may permit the customer of the promotions platform to view information for each of the suitable promotional activities related to the identified keywords, tags, or categories, which may include, by way of example and not limitation, the number and demographics of the participants for each of the identified promotional activities, the dates of operation of the promotional activities, and various other information. The customer of the promotional platform may then select one or more suitable promotional activities through which to poll participants, and may choose to specify additional details for particular demographic characteristics that are desired in participants to be polled. In addition, the poll sponsor/customer of the promotional platform may specify, for example, the maximum number of responses that are to be collected, and a deadline date for delivery to the poll sponsor/customer of the promotions platform of the responses collected by the promotional platform from the participants in the selected promotional activity/activities.

In embodiments in which polling is provided as a paid service, the poll sponsor/customer of the promotions platform may be provided with information about the expected cost of the results of the polling specified by the poll sponsor, and may specify a means of payment for the polling results and designate the recipient of the results of the polling activity. The poll sponsor/customer of the promotions platform may then request that the polling of participants be scheduled.

In a representative embodiment of the present disclosure, the question(s) provided by the poll sponsor may then be selectively included in polls presented as a condition of participation in the selected promotional activities, or as part of the promotional activities, and participant responses to the particular question(s) of the poll sponsor may be collected for delivery to the poll sponsor when a maximum specified number of responses are received, or a deadline for delivery of the responses occurs. In some representative embodiments of the disclosure, the poll sponsor/customer of the promotions platform may be sent email notifying them of the completion of a polling activity, which may include a link to permit them to retrieve and/or view the results of the polling activity from the promotions platform.

In the above manner, a representative embodiment of the present disclosure provides a mechanism to automatically poll consumers in a targeted, yet non-intrusive manner as part of another activity, and produce results quickly and at low cost, without the need to develop a polling plan and secure required resources for each desired poll. Because in some representative embodiments of the disclosure, per-sonal information about the polled participants is known, a representative embodiment of the present disclosure provides the options needed to get deeper insights around the demographics of who answered and how they answered, without revealing to the respondents the source of the particular poll questions of the poll sponsor.

An administration tool may be essential to the management of promotional activities such as, for example, sweepstakes, contests, giveaways, and/or instant wins. Additional information about examples of such promotional activities on an e-commerce platform may be found in, for example, U.S. patent application Ser. No. 13/956,978, entitled "Contests and Sweepstakes," filed Aug. 1, 2013, the complete subject matter of which is hereby incorporated herein, by reference, in its entirety. In accordance with an example embodiment of the disclosure, a suitable e-commerce promotions platform may provide a selection of a plurality of interactions in any combination, thereby enabling a novel production flow and user experience. One such example of a suitable promotional platform and administration tool is described in U.S. patent application Ser. No. 14/321,450, entitled "Methods and Systems for an E-Commerce Promotions Platform," filed Jul. 1, 2014, the complete subject matter of which is hereby incorporated herein by reference, in its entirety. An administration tool may automate the development process for complex interactions by, e.g., providing analytics as well as a streamlined production path to reduce cost and errors associated with production and deployment of sweepstakes, contests, giveaways, and/or instant wins. In accordance with an example embodiment of the disclosure, the administration tool may be implemented as a web based solution that streamlines the production path, approval process, and moves to publishing sweepstakes, contests, giveaways, and/or instant wins directly from within the administration tool.

In accordance with yet another example embodiment of the disclosure, the administration tool may automate the creation process of sweepstakes, contests, giveaways, and/or instant wins by implementing one or more functionalities. For example, the administration tool may perform auto generation of legal rules in the administration tool and allowing for savings of up to 6 hours each day across multiple resources on a business operations team. In addition, the administration tool may produce copy for social interactions may be auto-generated to reduce human error and sweepstakes, contests, giveaways, and/or instant wins set-up issues. This may prevent instances where business, legal, and engineering teams are spending time to figure out the best way to update a wrong copy of information on a live sweepstakes, contests, giveaways, and/or instant wins promotion. The administration tool may also produce "help" text for each social interaction may be auto generated, which may eliminate the need to copy/paste and hence saving time while reducing the margin for error. The administration tool may include functionality to clone a sweepstakes, a contest, a giveaway, and/or an instant wins promotion for a later re-launch. More specifically, with a few clicks, the administration tool may enable a previously run promotion to be reused. In addition, the administration tool may support recurring launches of sweepstakes, contests, instant wins and giveaways. Based on a launch cadence, a promotion may, for example, be set up to launch each day, or consecutively for a number of days, without intervention. In this regard, the need to clone a promotion from a previous day and launch it again with date changes for the next n days (e.g. for a promotion lifetime) may be eliminated. In some instances, "display logic" capability may also be added to this administration tool functionality.

In accordance with an example embodiment of the disclosure, the administration tool may integrate social interactions with sweepstakes, contests, giveaways, and/or instant wins promotions, and lower the cost of development from that of conventional techniques. The administration tool may be externalized and provide a friendly, web-based user interface and easy method for anyone wishing to act as a sponsor to create a promotion. The administration tool may take a limited amount of time (e.g., just a few minutes) to fill out screen of information of a web-based interface, and may provide a flow of screens that allow for approval and publishing to, e.g., a live promotions application.

A representative embodiment of the present disclosure may compare information about promotion participants against one or more conditions, and may issue notifications to the participants regarding their completion of tax related forms (e.g., U.S. Internal Revenue Service Form W-9, or other government reporting forms, or requirements) to enable their participation in a promotion.

A representative embodiment of the present disclosure may incorporate logic to manage the flow/ordering of actions to be performed by various organizations (e.g., operations, creative, legal, marketing, and analytics) in the setup of a promotional activity (e.g., a contest, sweepstakes), to insure that the involvement of any particular organization is not requested until all requirements (e.g., conditions, information developed/available, documents prepared, work completed) needed by that organization have been met and all management approvals secured.

A representative embodiment of the present disclosure provides an interface to systems separate from and external to the promotion platform, to permit those external systems to employ the functionality of the promotions platform.

Additional functionalities and screenshots associated with the particular aspects of an administration tool that are related to automated, targeted polling of potential respondents as part of promotional activities are disclosed herein in reference to the accompanying figures.

FIG. 1 is an illustration of an exemplary computer network 100 in which a representative embodiment of the present disclosure may be practiced. The following discloses various example systems and methods for, by way of example and not limitation, operating an e-commerce promotions platform for administering e-commerce promotions, such as sweepstakes, contests, giveaways, and/or instant wins, including functionality to perform automatic, targeted polling of users.

Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer-executable instructions comprising an operating system 46, one or more applications programs 48 (such as a Web browser), other program modules 50, and/or program data 52. Still further, computer-executable instructions may be downloaded to one or more of the computing devices as needed, for example via a network connection. Such computer-executable instructions may also support automated, targeted polling of users of various elements of the computer network 100 such as, for example, the processing devices 20, 20', 20" shown in FIG. 1.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing devices 20, 20', 20". In addition, the host system 68 would generally include executable instructions for, among other things, performing automated and targeted polling; identifying and recommending product items, coordinating storage and retrieval of documents; maintaining social network storage of a shopping list; receiving a location of a customer via a mobile device; maintaining maps and layouts of buildings and geographic areas. The host system 68 may include executable instructions for calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate. The host system 68 may also include executable instructions to perform routing of a received request via a distributed mobile video call center; providing a service call infrastructure for providing the requestor with a distributed customer service experience, and for an e-commerce promotions platform for administering e-commerce promotions, such as sweepstakes, contests, giveaways, and/or instant wins.

Communications between the processing devices 20, 20', 20" and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

FIGS. 2A-2D illustrate a flow diagram of an example method of operating an e-commerce promotions platform that supports automated, targeted polling of a plurality of consumers, and more specifically, the actions involved in the creation of a poll, in accordance with an representative embodiment of the present disclosure. The actions illustrated in FIGS. 2A-2D may be performed, at least in part by, for example, the elements of a computer network system such as the computer network 100 illustrated in FIG. 1. In a representative embodiment of the present disclosure, the e-commerce promotions platform may use a set of business rules of the operator of the platform, to enforce a particular flow of information and accountability.

Figure 2A:
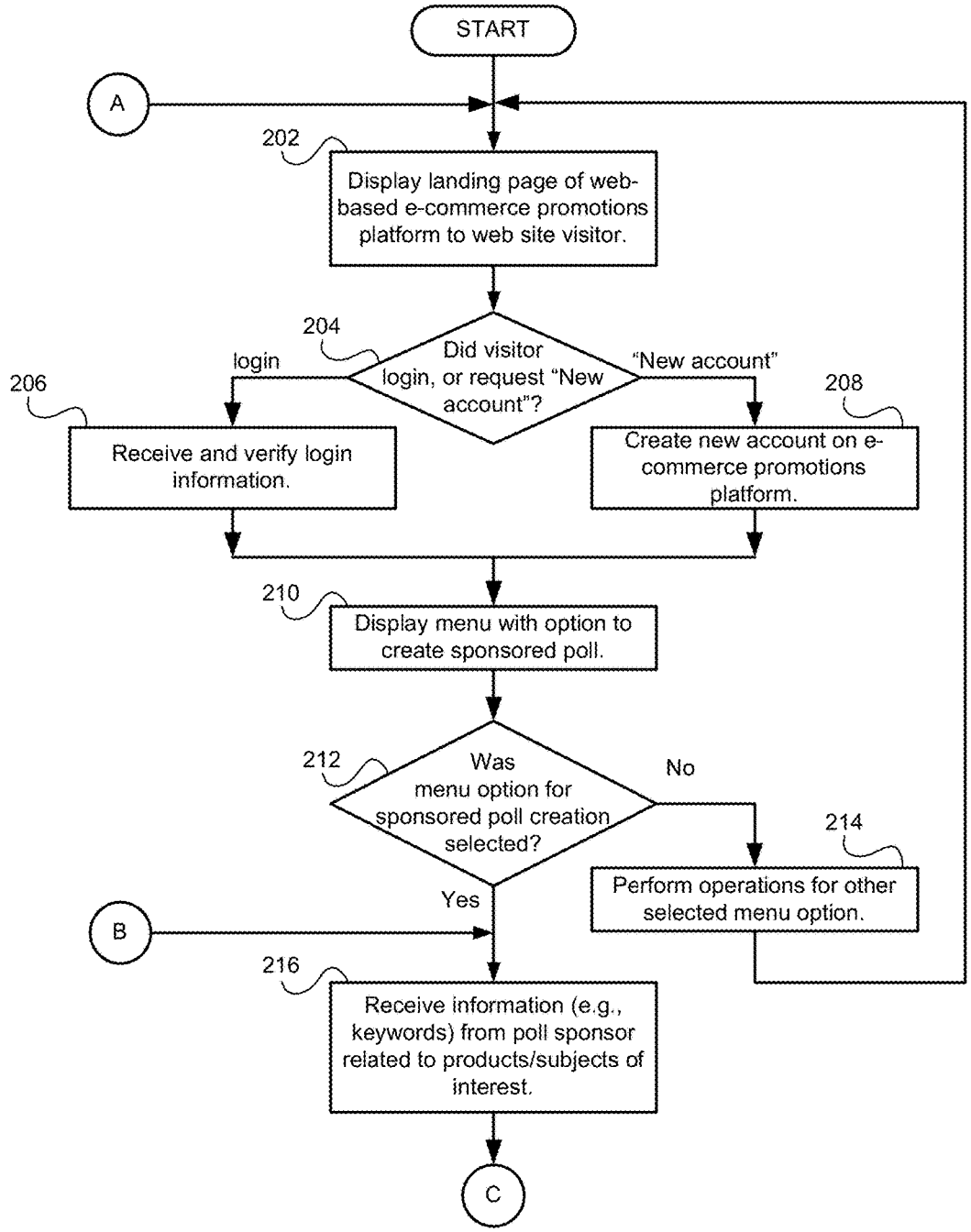
FIGS. 2A-2D illustrate a flow diagram of an example method of operating an e-commerce promotions platform that supports automated, targeted polling of a plurality of consumers, and more specifically, the actions involved in the creation of a poll, in accordance with an representative embodiment of the present disclosure.

The method of FIGS. 2A-2D begins at block 202 of FIG. 2A. At block 202, a visitor to a web site of an e-commerce promotions platform may be directed to an initial or "landing page" having functionality permitting a visitor to "login" or to create a new user account. Next, a block 204, a determination may be made as to whether the visitor entered information for "login," or requested the creation of a "new account." If the visitor entered information for "login," control passes to block 206, where such "login" information is received, and where the information for "login" is analyzed to determine whether the web site visitor is known to the system performing the method of FIGS. 2A-2D. If the visitor requested the creation of a "new account," the system then, at block 208, establishes a new account on the e-commerce promotions platform. Via either path, the method then proceeds at block 210, at which a menu may be displayed containing an option to create a sponsored poll.

At block 210, the method determines whether the user selected the menu option to create a sponsored poll. If the visitor did not select the menu option to create a sponsored poll, but instead chose another menu option, the method of FIG. 2A passes control to block 214, where the system performing the method of FIGS. 2A-2D performs whatever operations are needed to perform the selected menu option. Examples of some possible menu options are described in, for example, U.S. patent application Ser. No. 14/321,450, entitled "Methods and Systems for an E-Commerce Promotions Platform," filed Jul. 1, 2014, the complete subject matter of which is hereby incorporated herein, by reference, in its entirety. If, however, the visitor did select the menu option to create a sponsored poll, then at block 216, the system may display a screen for and receive information from the visitor (now a prospective poll sponsor), related to products and/or subjects about which the poll sponsor wishes to poll, and the method continues at block 218 of FIG. 2B. Such information may be in the form of, by way of example and not limitation, relevant keywords associated with the product or subject of interest to the poll sponsor.

Figure 2B:
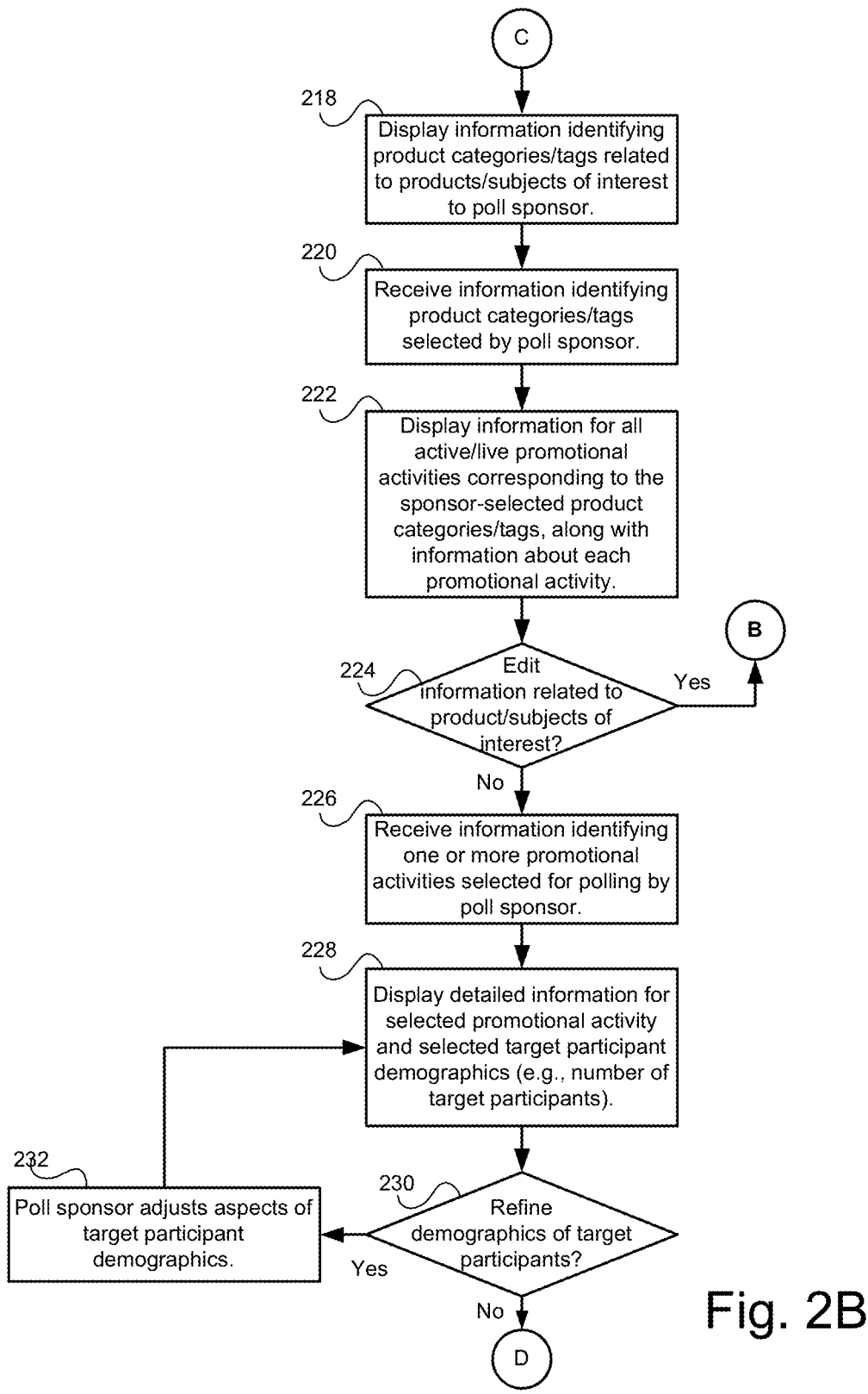

At block 218 of FIG. 2B, the system performing the method may display information identifying categories and/or tags related to products and/or subjects of based on, for example, the keyword information provided by the poll sponsor. Changes to the keyword information may be dynamically updated by the system as the poll sponsor explores various choices of keywords, to identify suitable categories and tags. Next, at block 220, information identifying categories and/or tags selected by the poll sponsor may be received by the system, and at block 222, information identifying active/live promotional activities running on the e-commerce promotions platform may be displayed, where the promotional activities identified are based upon the categories and/or tags selected by the poll sponsor. Additional information about each identified promotional activity may be shown including, by way of example and not limitation, the number of participants for each promotional activity, information identifying the demographics of the participants, the time period during which the promotional activity is running and other details. A check may be made, as shown at block 224, to determine whether any of the information related to the keywords, categories, and/or tags related to the products or subjects of interest have been edited/changed. If such changes are made by the poll sponsor, the method of FIG. 2B returns to block 216 of FIG. 2A, and the identified promotional activities may be dynamically updated according to any changes in keywords, categories and/or tags selected by the poll sponsor. If the, at block 224, it is determined that the poll sponsor has not changed the information related to the keywords, categories, and/or tags related to the products or subjects of interest, then control passes to block 226, described below.

At block 226 of FIG. 2B, the method receives information identifying one or more promotional activities selected for polling by the poll sponsor from the list displayed at block 222. Next, at block 228, the method of FIG. 2B directs the system to display additional details of the information about the promotional activities selected by the poll sponsor. Such information may include, by way of example and not limitation, the actual or estimated number of participants for each selected promotional activity, the demographics at which the respective promotional activity is targeted, the starting and ending dates and times of operation of the respective promotional activity, the type of prize or reward to be awarded, and the average cash value (ACV) of the prize or reward. Then, at block 230, the poll sponsor may choose to refine the demographics of the target participants for the polls to be run. If, at block 230, the poll sponsor choose to adjust parameters or characteristics of the demographics such as, for example, to further limit polling to a subset of the participants expected to take part in a particular sponsor-selected promotional activity, they may make such adjustments, at block 232, and the method of FIG. 2B may return to block 228 to display updated details of the information about the promotional activities selected by the poll sponsor. If the poll sponsor accepts the demographics of the target participants of any of the selected promotional activities, the poll sponsor need not make any adjustments, and control may then pass to block 232 of FIG. 2C.

Figure 2C:
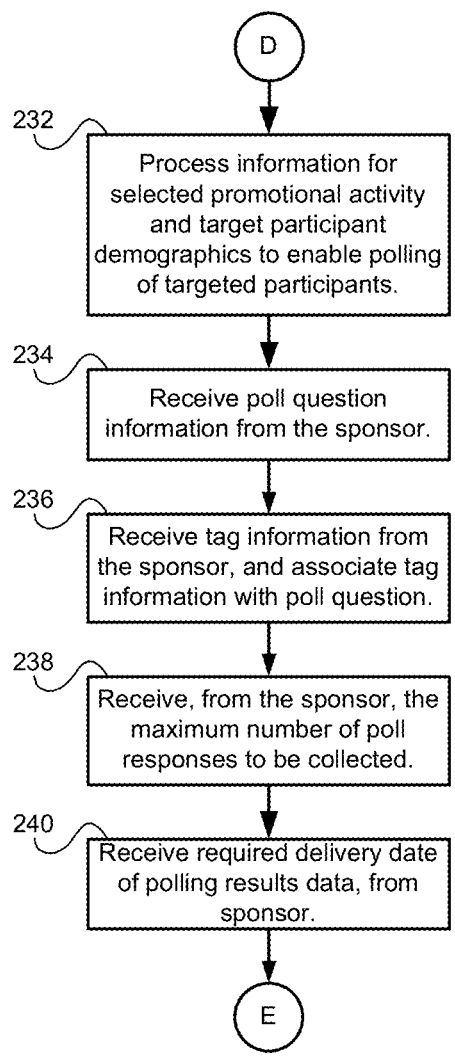

At block 232 of FIG. 2C, the method processes the information for the selected promotional activities, and any adjustment to the target participant demographics, to enable polling of the target participants. Then, at block 234, the system may receive information identifying one or more poll questions, from the poll sponsor. In some representative embodiments of the present disclosure, a collection of possible poll questions may be made available to the poll sponsor from which the poll sponsor may select suitable questions for their use and/or customization. The poll sponsor may also be provided with the functionality necessary to create their own poll questions, in the form of text, video, audio, and/or any other suitable media form, and may provide the poll sponsor with the tools to define one or more possible responses to be offered to the target participant for selection in responding to the presented questions. Next, at block 236, the system may receive tag information from the poll sponsor, and may associate the received tag information with one or more poll questions provided or chosen by the poll sponsor. The system may then, at block 238 of FIG. 2C, receive from the poll sponsor, a value identifying the maximum number of poll responses to be collected for delivery to the poll sponsor, and at block 240, receive from the poll sponsor, a deadline or delivery date by which the responses collected from the polled participants are to be provided to the poll sponsor. The method of FIGS. 2A-2D then continues at block 242 of FIG. 2D.

Figure 2D:
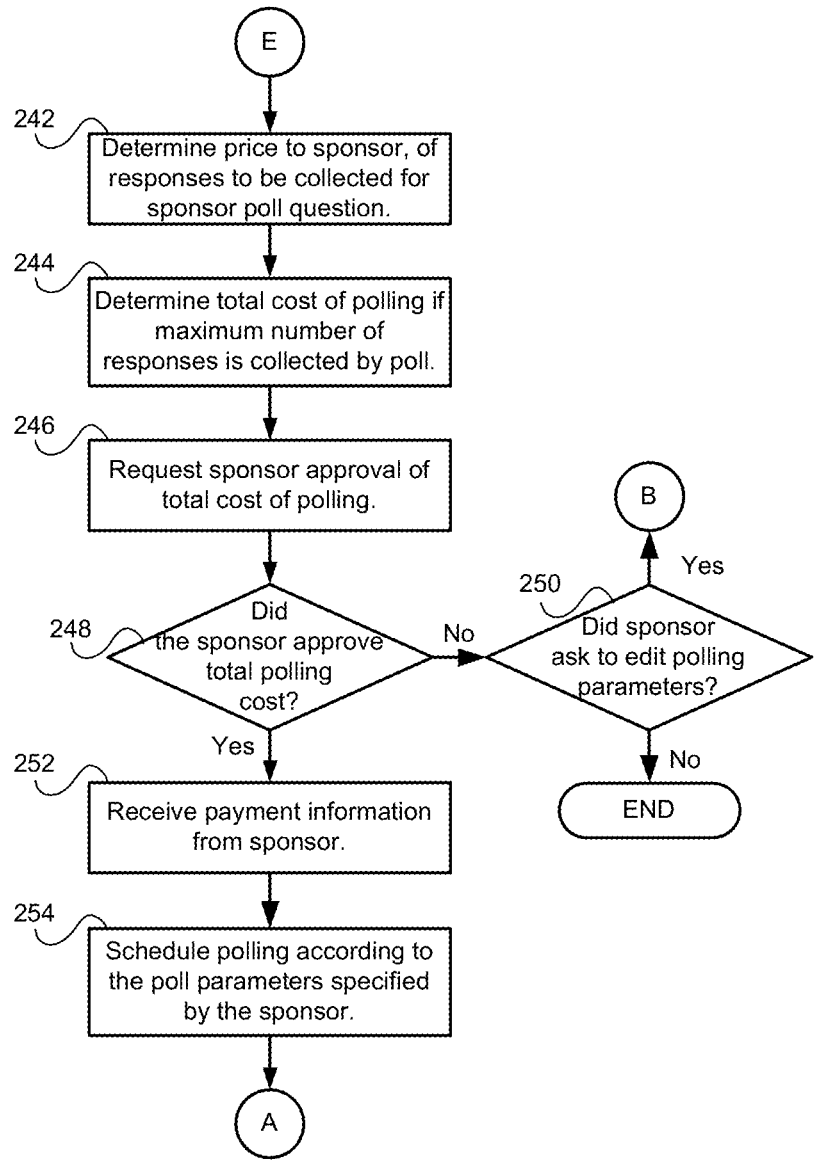

At block 242 of FIG. 2D, the method may determine a price, to the poll sponsor, of the responses to be collected for the poll question(s) of the poll sponsor. In some representative embodiments of the present disclosure, the pricing of responses may, by way of example and not limitation, be a fixed amount per response; may be set according to a sliding scale in which the response price changes with the number of responses collected, according to the number of polls sponsored, according to the particular promotional activities selected for polling by the poll sponsor; according to the demographics of the poll respondents or the target participants of the promotional activity, to name only a few approaches. In addition, some representative embodiments of the present disclosure may place the limited number of polling opportunities up for bid to potential poll sponsors, and let market demand define a response price based on the value of the response to the community of potential poll sponsors.

Next, at block 244 of FIG. 2D, the method may determine a total cost of the polling requested by a poll sponsor. The calculation of the total cost may be based, by way of example and not limitation, on a per response price, determined as described above with respect to block 242, and the maximum number responses to be collected for delivery to the poll sponsor. The system performing the method may then, at block 246, request approval of the total cost of the polling specified by the poll sponsor, and may determine, at block 248, whether the poll sponsor has given approved of the total cost of polling.

If, at block 248, it is determined that the poll sponsor has not approved the total cost of polling, a determination may be made, at block 250, as to whether the poll sponsor has requested to edit/change any of the parameters of the polling to be performed. Such changes may include, for example, modifying the number of responses to be collected, the number of promotional activities to be used for polling, the number of questions submitted by the poll sponsor for use in polling target participants, the duration of the polling, the yearly polling revenue for the poll sponsor, and the target demographics of the promotional activities selected for polling by the poll sponsor. If the poll sponsor chooses to change any of the polling parameters, the method of FIGS. 2A-2D continues at block 216, described above. If the poll sponsor, at block 248, does not approved the total cost of polling, and at block 250, does not choose to modify the parameters of the polling, the method of FIGS. 2A-2D ends. If, however, at block 248, the poll sponsor does approve of the total cost of polling, the method of FIG. 2D, at block 252, receives information from the poll sponsor identifying the means of payment to be used to cover the total cost of polling, and at block 254, the polling specified by the poll sponsor is scheduled on the e-commerce promotions platform of the present disclosure. The method of FIG. 2D continues at block 202 of FIG. 2A, to permit the specification, by the poll sponsor, of an additional poll.

Figure 3A:
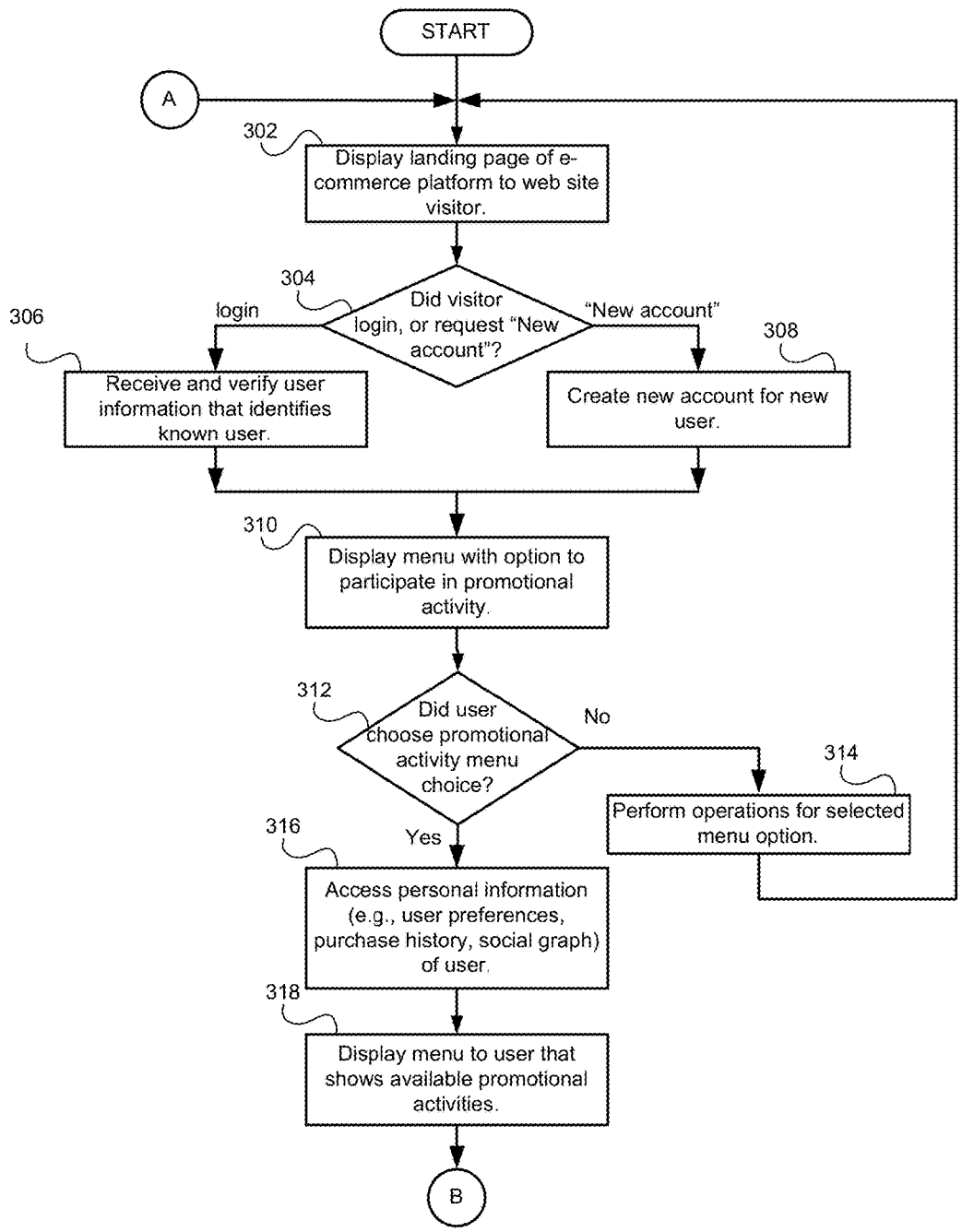
FIGS. 3A-3C illustrate a flow diagram of an example method of operating an e-commerce promotions platform that supports automated, targeted polling of a plurality of consumers, and more specifically, the actions involved in the polling of a participant in a promotional activity on an e-commerce promotions platform, in accordance with an representative embodiment of the present disclosure.
Figure 3B:
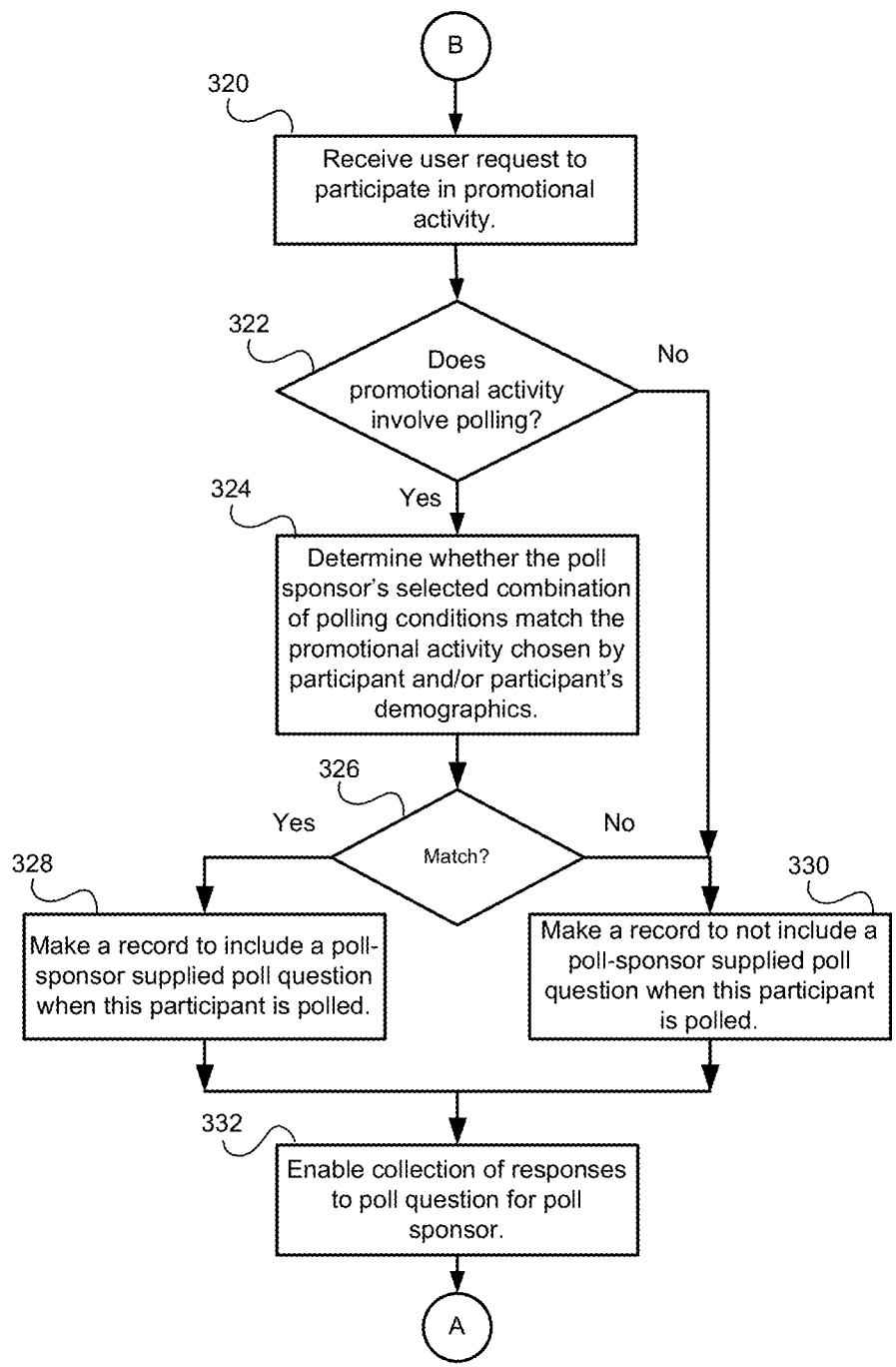
Figure 3C:
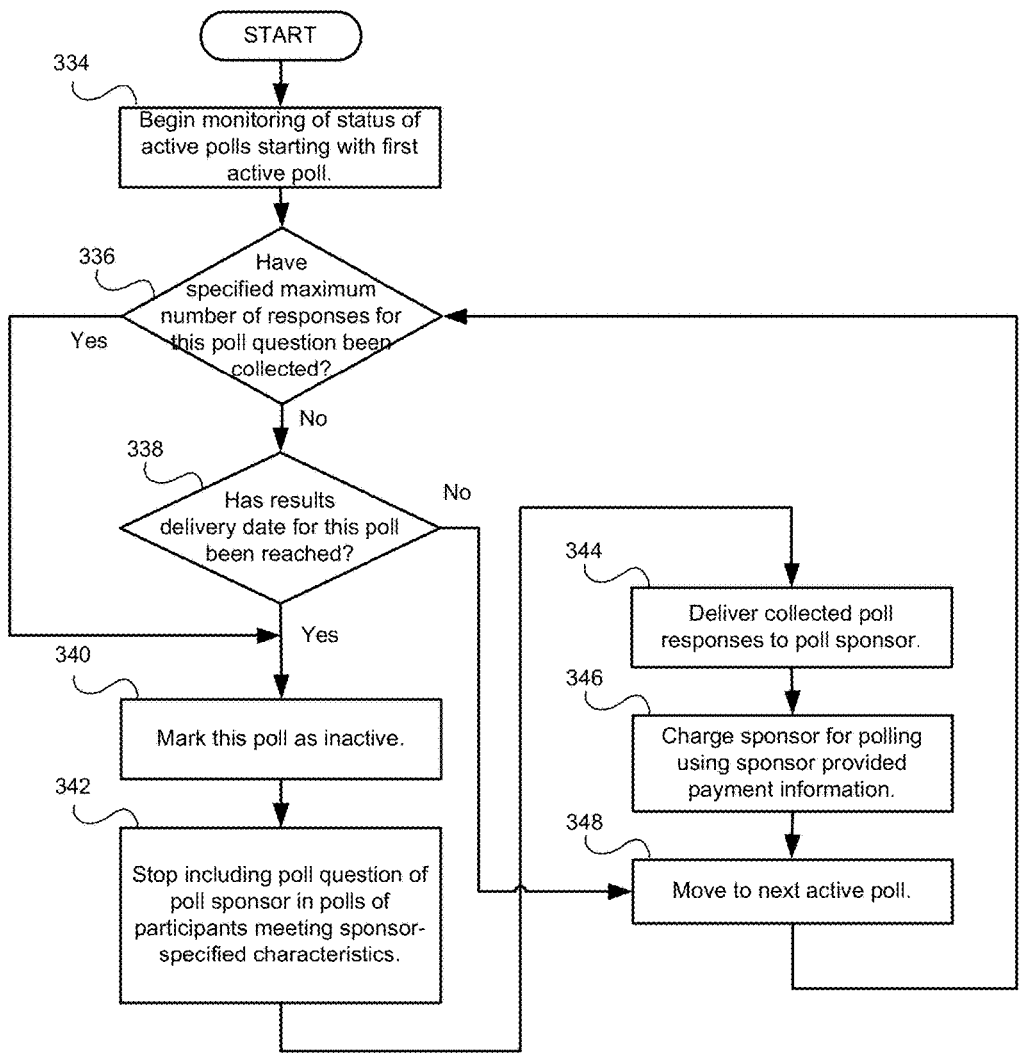

FIGS. 3A-3C illustrate a flow diagram of an example method of operating an e-commerce promotions platform that supports automated, targeted polling of a plurality of consumers, and more specifically, the actions involved in the polling of a participant in a promotional activity on an e-commerce promotions platform, in accordance with an representative embodiment of the present disclosure. The actions illustrated in FIGS. 3A-3C may be performed, at least in part by, for example, the elements of a computer network system such as the computer network 100 illustrated in FIG. 1. In a representative embodiment of the present disclosure, the e-commerce promotions platform may use a set of business rules of the operator of the platform, to enforce a particular flow of information and accountability.

The method of FIGS. 3A-3C begins at block 302 of FIG. 3A. At block 302, a visitor to a web site of an e-commerce platform may be directed to an initial or "landing page" having functionality permitting a visitor to "login" or to create a new user account. Next, a block 304, a determination may be made as to whether the visitor entered information for "login," or requested the creation of a "new account." If the visitor entered information for "login," control passes to block 306, where such "login" information is received, and where the information for "login" is analyzed to determine whether the web site visitor is known to the system performing the method of FIGS. 3A-3C. If the visitor requested the creation of a "new account," the system then, at block 308, establishes a new account on the e-commerce platform. Via either path, the method then proceeds at block 310, at which point a menu may be displayed containing an option to participate in a promotional activity such as, by way of example and not limitation, a contest, a sweepstakes, a giveaway, or an instant win.

At block 310, the method determines whether the user selected the menu option to participate in a promotional activity such as the examples described above. If the visitor did not select the menu option to participate in a promotional activity, but instead chose another menu option, the method of FIG. 3A passes control to block 314, where the system performing the method of FIGS. 3A-3C performs whatever operations are needed to perform the selected menu option. Examples of some possible menu options are described in, for example, U.S. patent application Ser. No. 13/956,978, entitled "Contests and Sweepstakes," filed Aug. 1, 2013, the complete subject matter of which is hereby incorporated herein, by reference, in its entirety. If, however, the visitor did select the menu option to participate in a promotional activity, then at block 316, the system may access personal information for the user including, by way of example and not limitation, user preferences (e.g., product, brand, style, color, size, designer, merchant location), purchase history information, social networks, social networks, social graph, family status, merchant affinity information, merchant loyalty program information, life stage, residence address, hobbies, and interests, to name only a few types. Next, at block 318, the method of FIG. 3A may display a menu showing, among other things, what promotional activities are available to the user. Such a menu may, for example, be configured according to various elements of the personal information accessed at block 316. The method of FIGS. 3A-3C then continues at block 320 of FIG. 3B.

At block 320 of FIG. 3B, the system performing the method may receive a request from the user to participate in a selected promotional activity that may include, by way of example and not limitation, a contest, a sweepstakes, a giveaway, or an instant win. The method may then, at block 322, make a determination of whether qualification for participation or other aspects of the promotional activity selected by the user, involves polling of the user. If the promotional activity selected by the user does not involve polling, the method proceeds to block 330, where the method makes a record to not include a poll-sponsor supplied poll question when this participant is polled. The method then continues at block 332, described below. If however, at block 322, it is determined that the promotional activity selected by the user does involve polling, then the method passes control to block 324, where the method determines whether the poll sponsor's selected combination of polling conditions match the promotional activity chosen by participant and/or the participant's demographics. As discussed above, in a representative embodiment of the present disclosure, the polling conditions selected by the sponsor may include conditions related to the promotional activity such as, for example, the target demographics of the promotional activity, and the demographic information of the user/participant in the promotional activity. If, at block 326, it is found that the method, at block 324, determined that a match exists, then the method of FIG. 3B makes a record to include a poll-sponsor supplied poll question when this participant is polled. The method then continues at block 332. At block 332, the method enables collection of responses to the poll question(s) of this poll of the poll sponsor, and the method of FIGS. 3A-3C continues at block 302 of FIG. 3A.

The portion of the method of FIGS. 3A-3C shown in FIG. 3C may be realized as a background or monitoring process to track the polling actions associated with a number of promotional activities. It may be processed, for example, as a separate thread or process, or may be otherwise suitably implemented. The actions of the method show in FIG. 3C may be performed in parallel with the actions shown in the methods illustrated in FIGS. 2A-2D and FIGS. 3A-3B. The method portion shown in FIG. 3C assumes that a list of active polls is maintained by the system of the present disclosure, that new active polls are added when a poll sponsor creates a new poll or activates an earlier-defined poll, and that polls are deleted when the polling for that poll is completed. The method of FIG. 3C begins at block 334, where the method begins the monitoring of polling actions with the first active poll in the system of the present disclosure. Next, at block 336, the method of FIG. 3C determines whether maximum number of responses specified by the sponsor of the current poll have been collected. If the maximum number of responses specified by the sponsor of the current poll have not yet been collected, the method continues at block 338, where a determination is made as to whether the results deadline/delivery date, specified by the poll sponsor, has been reached. If, at block 338, it is determined that the results deadline/delivery date has not been reached, then control of the method passes to block 348, where the method of FIG. 3C moves on to check the status the next active poll. The method then continues at block 336, as described above. However, if at block 338, it is determined that the results deadline/delivery date has been reached, the method continues at block 340, described below.

At block 340 of FIG. 3C, the current poll is marked as inactive, as either the deadline for delivery of results has passed and collected responses must be sent to the sponsor of the current poll, or the maximum number of responses, as specified by the poll sponsor, has been collected. Next, at block 342, the method stops including poll question for the current poll in polls of participants meeting the sponsor-specified conditions. The method then moves to block 344, at which point the system delivers the responses collected for the current poll to a recipient designated by the sponsor of the current poll. Next, at block 346, the system charges the sponsor of the current poll for the total cost of the polling activity, using the payment information provided during creation of the current poll. Then, at block 348, the method of FIG. 3C moves on to check the status the next active poll, repeating the actions while active polls exist.

Figure 4:
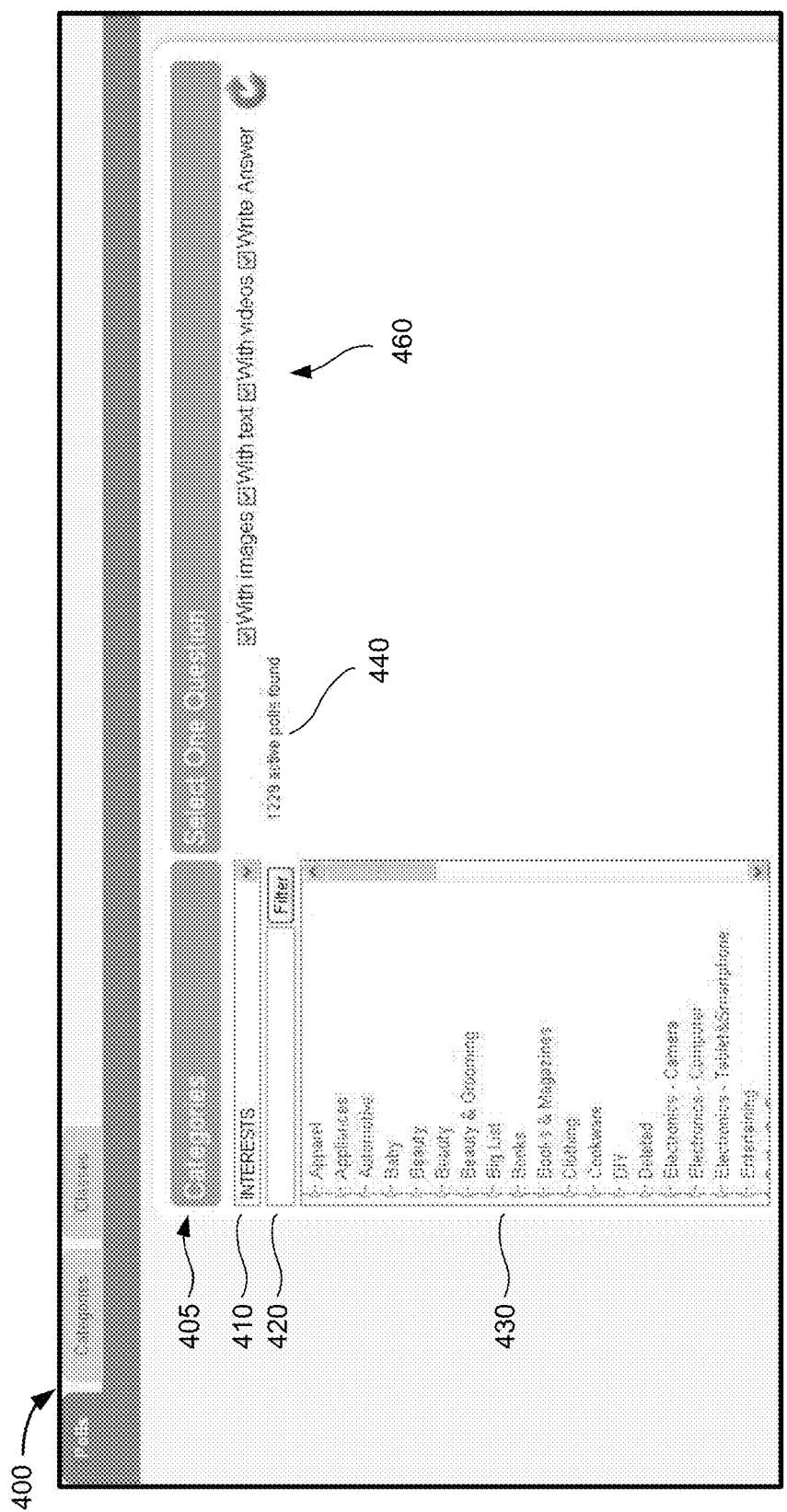
FIG. 4 is an illustration of a screen image showing an example polls tab web page, in accordance with the present disclosure.

FIG. 4 is an illustration of a screen image showing an example polls tab web page 400, in accordance with the present disclosure. The illustration of FIG. 4 includes a "Categories" portion 405 with a pull-down list 410 for selecting a "Poll class" of "Interest" or "Profile" (not shown), a pull-down list 420 for selecting various values for filtering the resulting information, and a scrollable list of categories of products 430, which may be used in identifying currently active polls. The number of active polls matching the filter parameters may be shown by an indicator 440. Check boxes 460 may be used to further filter the results of the search in order to limit the display to those actives polls having questions in the indicated format (e.g., "With images," "With text," "With videos," or "Write answer."

Figure 5:
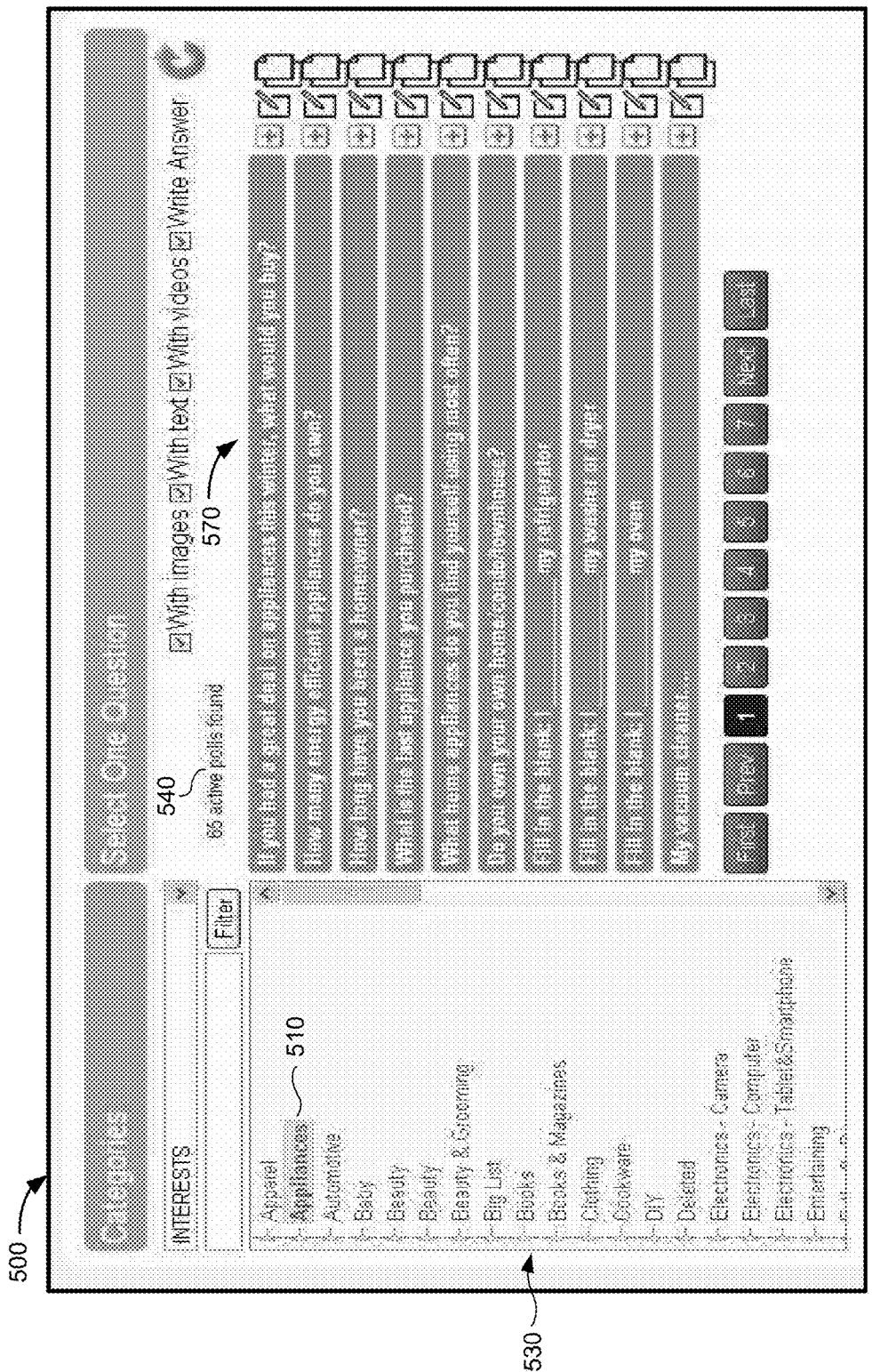
FIG. 5 is an illustration of a screen image showing another example polls tab web page, in accordance with the present disclosure.

FIG. 5 is an illustration of a screen image showing another example polls tab web page 500, in accordance with the present disclosure. The illustration of FIG. 5 includes a "Categories" portion with a pull-down list for selecting polls of class type "Interest" or "Profile" (not shown), a pull-down list for selecting various values for filtering the resulting information, and a scrollable list of categories of products 530, which may be used in identifying currently active polls, like the similar element shown above in regard to FIG. 4. In the illustration of FIG. 5, the "Appliances" category 510 has been selected, and the number of active polls matching the illustrated filter parameters is shown as 65 active polls, by the indicator 540. The example of FIG. 5 also includes check boxes that may be used to select further filtering of the results of the search in order to limit the display to those actives polls having questions in the indicated format (e.g., "With images," "With text," "With videos," or "Write answer," as in FIG. 4. As illustrated in FIG. 5, a list of stock questions 570 that may be provided by the system of the present disclosure, is shown. Additional user interface elements are also included to permit the user to display additional pages of questions, should the number of stock questions exceed one screen, and to display additional information about any question, or to modify any of the questions shown.

Figure 6:
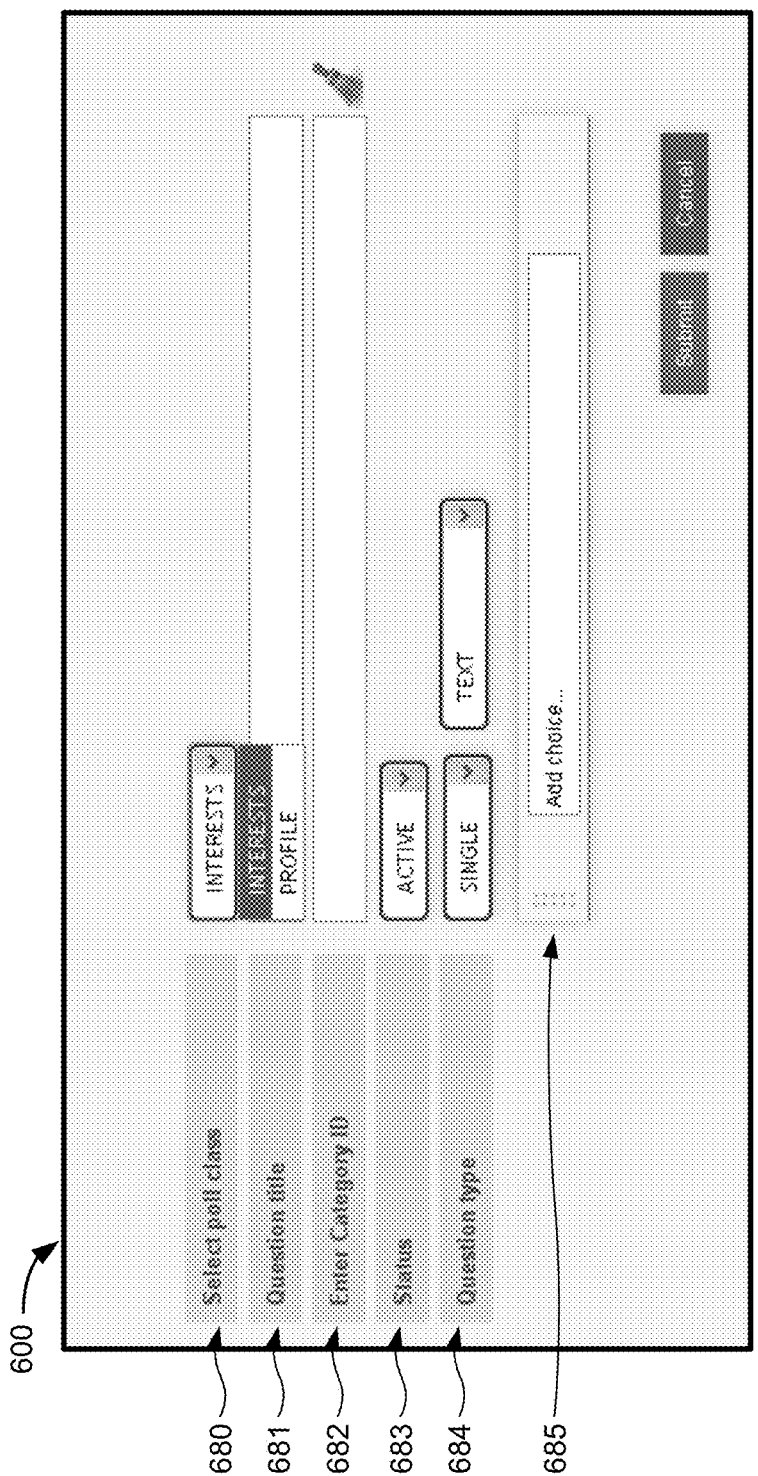
FIG. 6 is an illustration of a screen image showing an example poll creation pop-up window, in accordance with the present disclosure.

FIG. 6 is an illustration of a screen image showing an example poll creation pop-up window 600, in accordance with the present disclosure. The illustration of FIG. 6 includes a poll class pull-down list 680 that permits the creator of the poll to select a poll class of either "Interest" or "Profile" (not shown), and a question title field 681 for entry of the title of the poll question. The question creation pop-up window 600 also includes a category ID field 682 for identification of the poll category, and a poll status pull-down list 683, to permit the setting/review of the status of the poll. The illustration of FIG. 6 also shows a question type portion 684, including a pull-down list enabling selection of single response or multiple-choice type questions, and a question format pull-down list, to enable the selection of the format of the question as "text," "image," and "video." The example of FIG. 6 shows one poll response choice field 685 to permit the entry of the response choice for use in responding to the question of the poll. "Submit" and "Cancel" command buttons are provided to enable the user to enter the information for the poll, or to discard the entries and end the creation of the poll.

Figure 7:
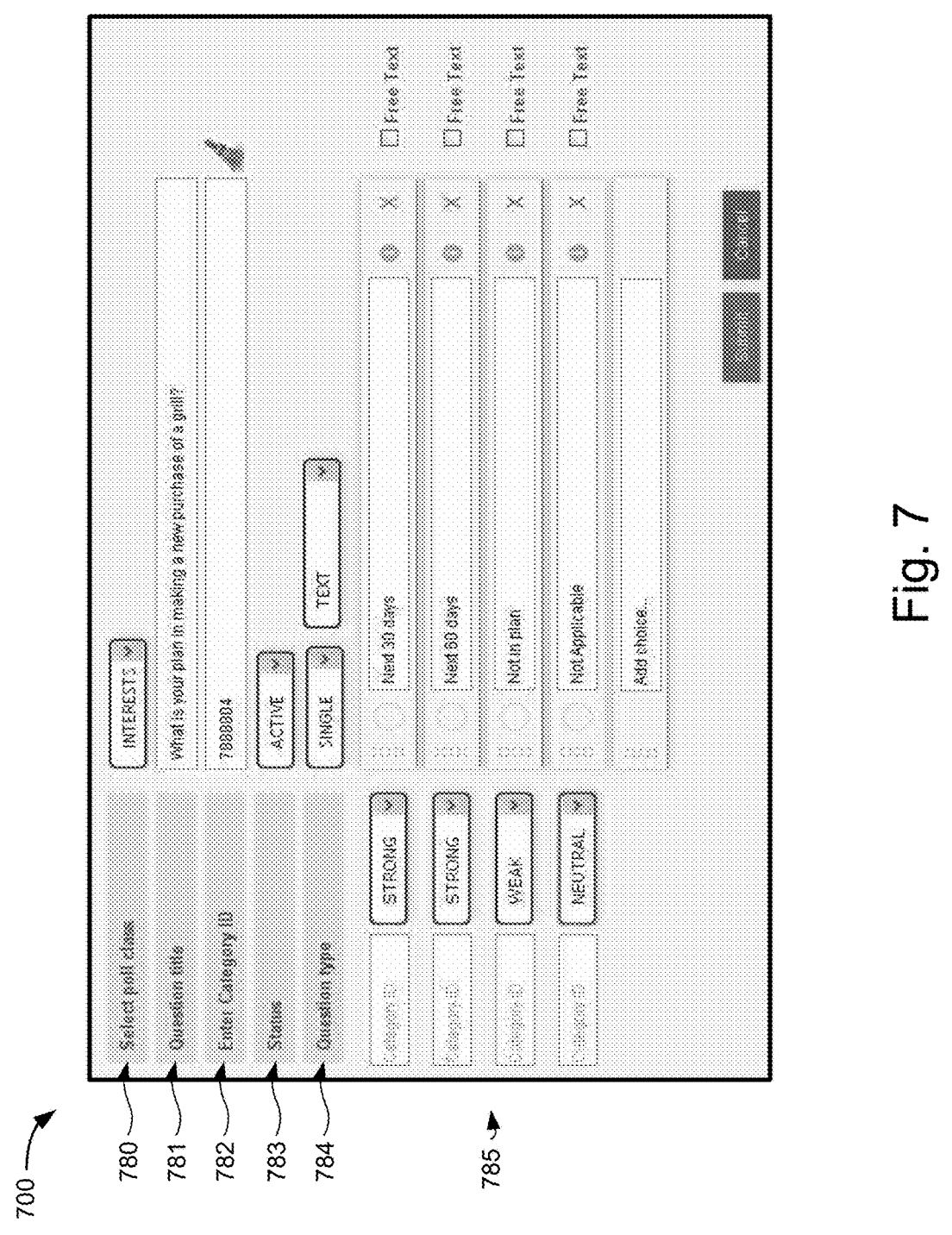

FIG. 7 is an illustration of a screen image showing another example poll creation pop-up window 700, in accordance with the present disclosure. As shown in FIG. 6, the illustration of FIG. 7 includes a poll class pull-down list 780 that permits the creator of the poll to select a poll class of either "Interest" or "Profile" (not shown), and a question title field 781 for entry of the title of the poll question. The question creation pop-up window 700 also includes a category ID field 782 for identification of the poll category, and a poll status pull-down list 783, to permit the setting/viewing of the status of the poll. The illustration of FIG. 7 also shows a question type portion 784, including a pull-down list enabling selection of single response or multiple-choice type questions, and a question format pull-down list, to enable the selection of the format of the question, as in FIG. 6. The example of FIG. 7 shows multiple instances of choice field 685 that permit the entry of various response choices and related parameters, for use in entering the possible responses to the questions of the poll. "Submit" and "Cancel" command buttons are also provided to enable the user to enter the information for the poll, or to discard the entries and end the creation of the poll.

Figures 8, 9:
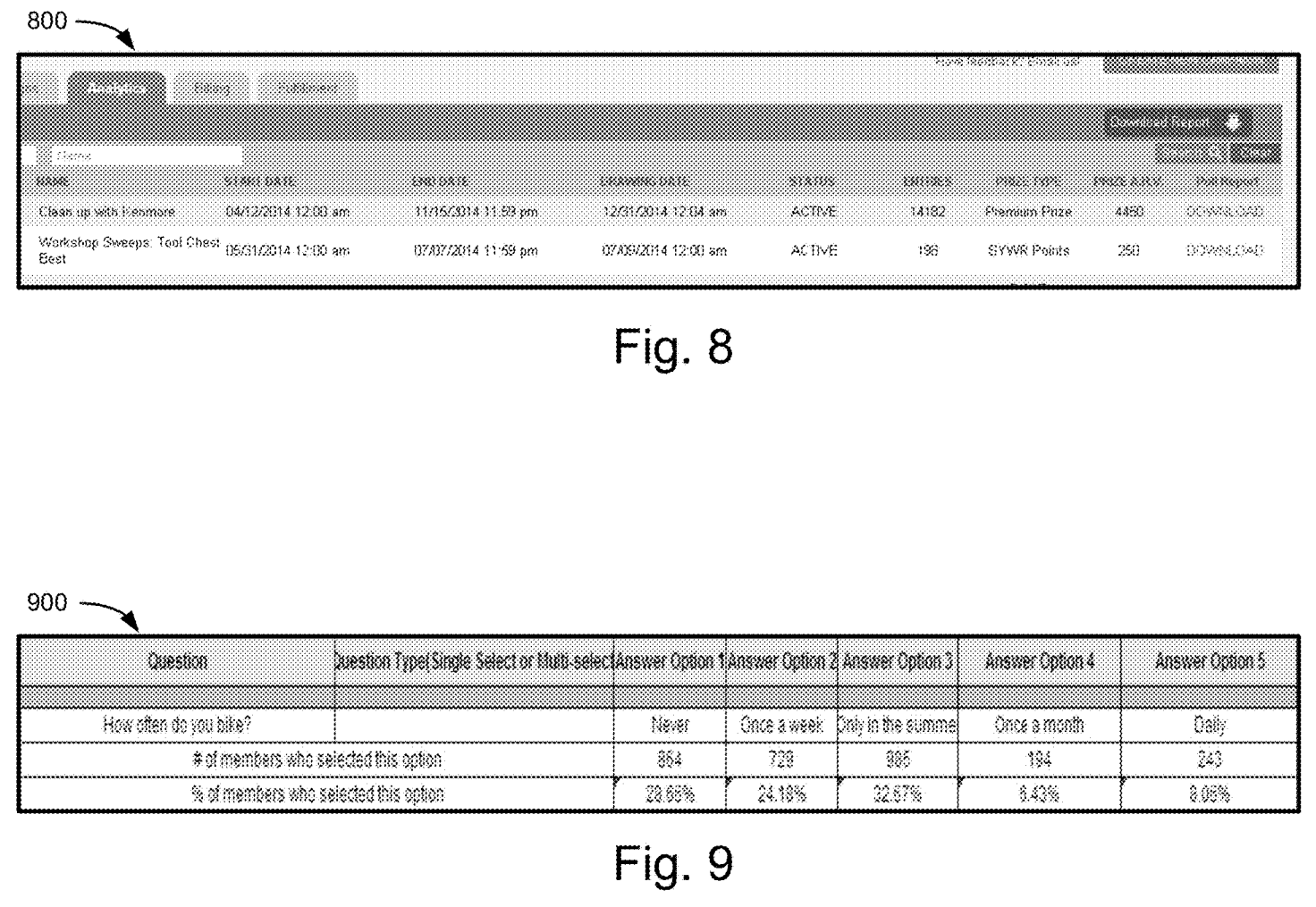

FIG. 8 illustrates an example chart 800 of analytics information showing two rows of information for two promotional activities, in accordance with the present disclosure.

FIG. 9 is an illustration of an example chart 900 showing information for a poll question, in accordance with the present disclosure. The chart identifies the question asked, and the answer options available to the respondents. The chart of FIG. 9 also shows the number of participants that selected each of/responded with the illustrated answer options, and the corresponding percentage of the respondents by answer choice.

FIG. 10 is an illustration of an example table showing information about a sweepstakes type promotional activity, in accordance with the present disclosure. The table of FIG. 10 includes the name of the sweepstakes promotional activity (i.e., "Bike Month Bike Giveaway," the start and end dates of the promotional activity, the total number of participant entries, and the total number of unique sweepstakes entrants.

FIG. 11 is an illustration of a example chart showing the questions presented to a poll participant and the corresponding responses, including a participant identifier, in accordance with the present disclosure.

Figure 12:
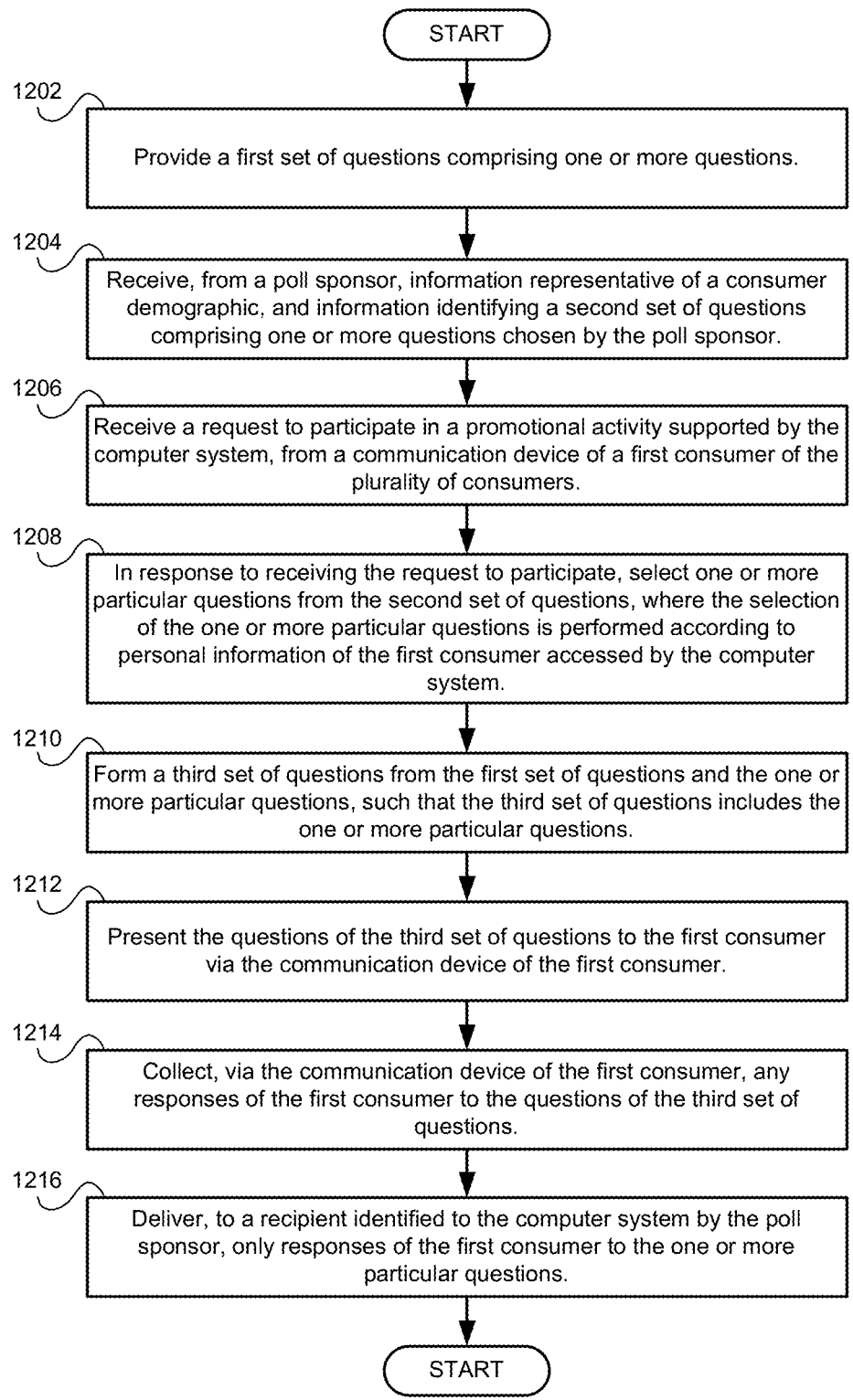
FIG. 12 illustrates a flow diagram of an example method a method of operating an e-commerce promotions platform that supports automated targeted polling of a plurality of consumers, in accordance with an example embodiment of the disclosure.

FIG. 12 illustrates a flow diagram of an example method a method of operating an e-commerce promotions platform that supports automated targeted polling of a plurality of consumers, in accordance with an example embodiment of the present disclosure. The actions of the method of FIG. 12 may be performed by a system such as, for example, the suitable elements of the computer network 100 of FIG. 1. The method of FIG. 12 begins at block 1202, where the system provides a first set of questions comprising one or more questions. Next, at block 1204, the method may receive, from a poll sponsor, information representative of a consumer demographic, and information identifying a second set of questions comprising one or more questions chosen by the poll sponsor. Then, at block 1206, the method may receive a request to participate in a promotional activity supported by the computer system, from a communication device of a first consumer of the plurality of consumers. At block 1208, the method may, in response to receiving the request to participate, select one or more particular questions from the second set of questions, where the selection of the one or more particular questions is performed according to personal information of the first consumer accessed by the computer system. Then, at block 2110, the method of FIG. 12 may form a third set of questions from the first set of questions and the one or more particular questions, such that the third set of questions includes the one or more particular questions. Next, at block 1212, the method may direct the system to present the questions of the third set of questions to the first consumer via the communication device of the first consumer. At block 1214, the method may collect, via the communication device of the first consumer, any responses of the first consumer to the questions of the third set of questions. Finally, at block 1216, the method of FIG. 12 may deliver, to a recipient identified to the computer system by the poll sponsor, only responses of the first consumer to the one or more particular questions.

Figure 13:
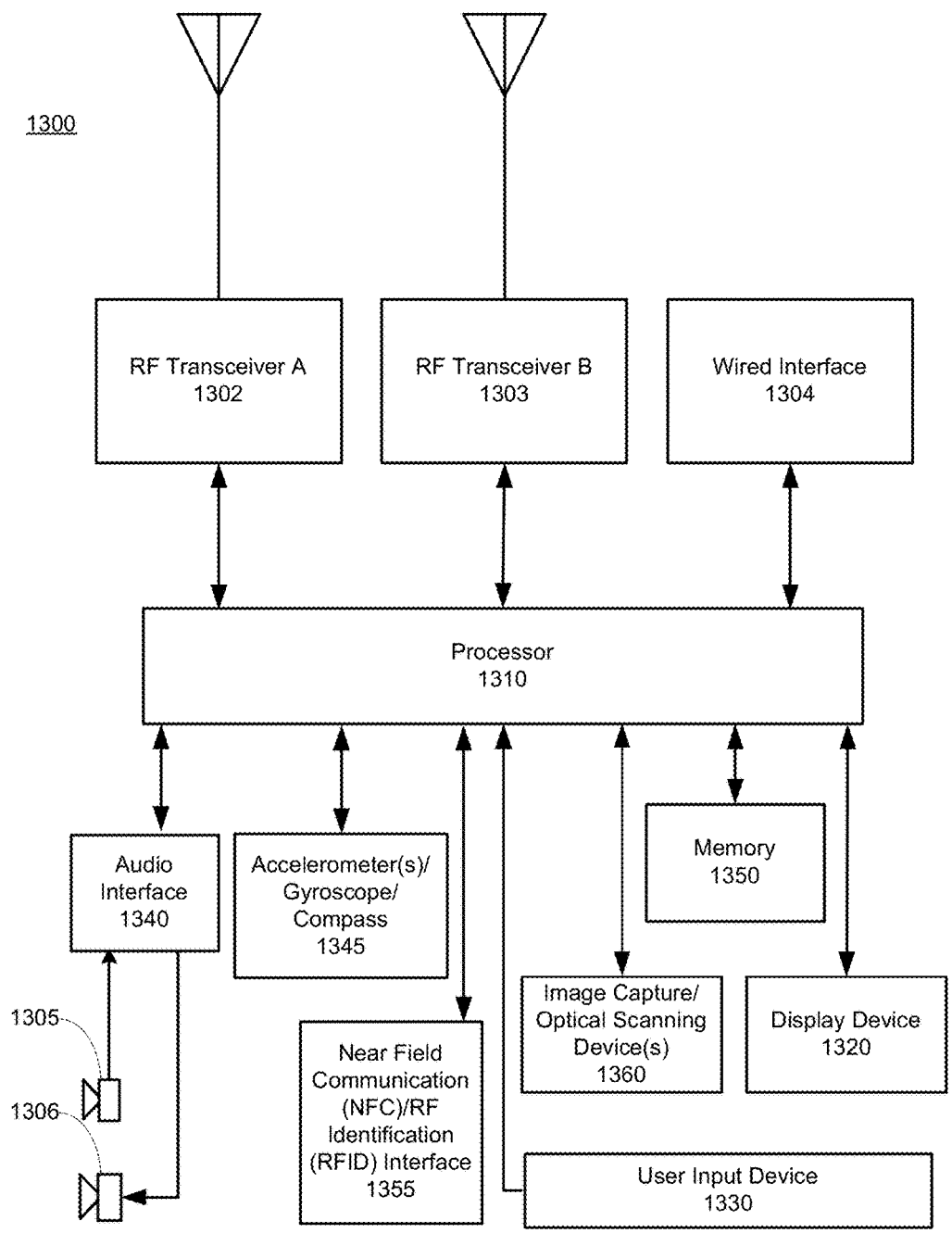
FIG. 13 is a block diagram illustrating a personal electronic device that may correspond to, for example, the electronic devices shown in FIG. 1, in accordance with a representative embodiment of the present disclosure.

FIG. 13 is a block diagram illustrating a personal electronic device 1300 that may correspond to, for example, the electronic devices 20', 20', 20" shown in FIG. 1, in accordance with a representative embodiment of the present disclosure. The personal electronic device 1300 may correspond to electronic user devices such as, by way of example and not limitation, a smart phone, a tablet computer, a cellular phone, a media player, a handheld personal computer, a laptop, a notebook computer, a net book computer, a desktop computer, a television, or any other suitable electronic device having the functionality discussed herein.

As shown in FIG. 13, the personal electronic device 1300 includes a processor 1310, an RF transceiver A 1302, an RF transceiver B 1303, a wired interface 1304, a display device 1320, a user input device 1330, an audio interface 1340, one or more accelerometers, gyroscopes, or compasses 1345, a memory 1350, near field communication (NFC)/radio frequency identification (RFID) interface 1355, and an image capture/optical scanning device 1360. The processor 1310 may be, for example, a suitable microprocessor or microcomputer having sufficient computing power to control the personal electronic device 1300, and is operably coupled to the RF transceiver A 1302, the RF transceiver B 1303, and the wired interface 1304. The RF transceiver A 1302 and RF transceiver B 1303 may comprise any necessary circuitry, logic, and software/firmware for wireless communication using any of, for example, the cellular, Bluetooth, Wi-Fi (e.g., IEEE 802.11a/b/g/n/ac), Zigbee, WiMAX, Near Field Communication (NFC), radio frequency identifier (RFID), or any other wireless network air interface standard known now or in the future. The wired interface 604 may comprise any necessary circuitry, logic, and software/firmware for wired communication over any of, for example, an Ethernet, Universal Serial Bus, FireWire (IEEE 1394) or other wired networks known now or in the future.

The processor 1310 is also operably coupled to the memory 1350, which may be used for non-transitory storage of executable program instructions, parameters, and data for management and control of any of the circuitry of the personal electronic device 1300. The processor 1310 is also operably coupled to the display device 1320, which may comprise, for example, one or more LED, OLED, LCD, or other suitable form of visual display capable of presenting text and/or graphics, and may comprise any circuitry, logic, or software/firmware to support, for example, a graphical user interface (GUI). The processor 1310 is operably coupled to the user input device 1330, which may comprise, for example, suitable switches, buttons, or touch sensitive surfaces to enable user control and operation of the personal electronic device 1300, and may comprise any necessary circuitry, logic, and software/firmware to allow the user input device 1330 to perform those functions. In a representative embodiment of the present invention, the user input device 1330 may, for example, be include a touch sensitive surface at the viewing side of the display device 1320, enabling a user to use the touch sensitive surface of the display device to enter user inputs and respond to information displayed on the display device 1320.

The processor 1310 is also operably coupled to the audio interface 1340, which comprises any necessary circuitry, logic, and software to interface a microphone 1305 and a speaker 1306 to the processor 1310. In some representative embodiments of the present invention, the processor 1310 may be operably coupled to a NFC/RFID interface 1355 that may be used to communicate with, by way of example and not limitation, NFC/RFID-enabled electronic shelf labels (ESLs), credit and identification cards and badges, tags, keychain fobs, and any other devices having NFC and/or RFID communication capability. In addition, the processor 1310 is operably coupled to an image capture/optical scanning device 1360 that may include, by way of example and not limitation, a monochrome or color digital imaging device, a digital camera, an infrared receiver, and/or a scanner capable of detecting light signals representative of bar codes (e.g., UPC), two-dimensional codes (e.g., a QR code), images, or other forms of optical information known now or in the future.

Aspects of the present disclosure may be seen in a method of operating an e-commerce promotions platform that supports automated targeted polling of a plurality of consumers. Such a method may comprise, in a computer system configured to manage a promotional activity on an e-commerce platform that communicatively couples to a respective communication device of each of a plurality of users, providing a first set of questions comprising one or more questions, and receiving, from a poll sponsor, information representative of a consumer demographic, and information identifying a second set of questions comprising one or more questions chosen by the poll sponsor. The method may also comprise receiving a request to participate in a promotional activity supported by the computer system, from a communication device of a first consumer of the plurality of consumers; and in response to receiving the request to participate, selecting one or more particular questions from the second set of questions, wherein the selection of the one or more particular questions is performed according to personal information of the first consumer accessed by the computer system. The method may further comprise forming a third set of questions from the first set of questions and the one or more particular questions, such that the third set of questions includes the one or more particular questions; and presenting the questions of the third set of questions to the first consumer via the communication device of the first consumer. Such a method may comprise collecting, via the communication device of the first consumer, any responses of the first consumer to the questions of the third set of questions; and delivering, to a recipient identified to the computer system by the poll sponsor, only responses of the first consumer to the one or more particular questions.

In various representative embodiments of the present disclosure, a consumer response to the third set of questions may be a condition of participation in the promotional activity; the promotional activity may be one of a contest, a sweepstakes, an instant win, and a give-away; and personal information of the first consumer may be stored by the computer system as part of membership in a loyalty program of a sponsor of the promotional activity. The one or more particular questions may be selected according to personal information of the first consumer accessed by the computer system in response to the request to participate in the promotional activity, and the questions of the first set of questions may be provided by the operator of the computer system. The information representative of a consumer demographic may comprise one or more characteristics common to a group of consumers, and may comprise information identifying a particular promotional activity targeted to a group of consumers having certain common characteristics specified by the poll sponsor.

Additional aspects of the present disclosure may be observed in a non-transitory computer-readable medium having stored thereon, one or more code sections each comprising a plurality of instructions executable by at least one processor, the instructions for causing the at least one processor to perform actions of the method described above.

Further aspects of the present disclosure may be found in system for operating an e-commerce promotions platform that supports automated targeted polling of a plurality of consumers, in which the system comprises a computer system comprising at least one processor that, during operation, manages a promotional activity on an e-commerce platform that communicatively couples to a respective communication device of each of a plurality of users. In such a system, the at least one processor may be operable to at least perform the actions of the method described above.

Accordingly, aspects of the disclosure may be realized in hardware, software, firmware or a combination thereof. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present disclosure may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present disclosure may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present disclosure.

While the disclosure has described certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method of operating an e-commerce promotions platform that supports automated targeted polling of a plurality of consumers, the method comprising:

in a computer system configured to manage a promotional activity on an e-commerce platform that communicatively couples to a respective communication device of each of a plurality of users, configuring, via a creation user interface, one or more graphical user interfaces for generating questions, wherein the creation user interface is configured to set for a particular question, via one or more graphical elements, a poll class, a poll category identification, a poll status, a question type, and a question format;

causing, via a selection of one or more graphical elements of a graphical user interface, the graphical user interface to filter promotional activities by question format including one or more of questions with images, questions with videos, and questions with write-in responses;

identifying, from the promotional activities supported by the e-commerce platform, one or more available promotional activities that are suitable for polling based on input from a poll sponsor;

selecting, by the poll sponsor, a promotional activity from the one or more available promotional activities;

providing a first set of questions comprising one or more questions;

receiving, from the poll sponsor, information representative of a consumer demographic, and information identifying a second set of questions comprising one or more questions chosen by the poll sponsor;

receiving, from the poll sponsor, tag information;

associating the received tag information with tags that correspond to the one or more questions chosen by the poll sponsor;

receiving a request to participate in a promotional activity supported by the computer system, from a communication device of a first consumer of the plurality of consumers;

in response to receiving the request to participate, selecting one or more particular questions from the second set of questions, wherein the selection of the one or more particular questions is performed according to personal information of the first consumer stored in a loyalty program and accessed by the computer system;

forming a third set of questions from the first set of questions and the one or more particular questions, such that the third set of questions includes the one or more particular questions;

presenting the questions of the third set of questions to the first consumer via the communication device of the first consumer;

collecting, via the communication device of the first consumer, any responses of the first consumer to the questions of the third set of questions; and delivering, to a recipient identified to the computer system by the poll sponsor, responses of the first consumer to the one or more particular questions.

2. The method according to claim 1, comprising determining whether the first consumer can participate in the promotion activity based on a consumer response of the first consumer to the third set of questions.

3. The method according to claim 1, comprising identifying, from contests, sweepstakes, instant wins, and give-aways supported by the e-commerce platform, one or more of the contests, the sweepstakes, the instant wins, and the give-aways that are suitable for polling based on input from the poll sponsor.

4. The method according to claim 1, comprising:
storing the personal information of the first consumer as part of a loyalty program of the sponsor of the promotional activity; and
selecting the one or more particular questions from the second set of questions based on the stored personal information of the loyalty program.

5. The method according to claim 1, comprising:
accessing the personal information of the first consumer in response to the request to participate in the promotional activity; and
selecting the one or more particular questions from the second set of questions based on the accessed personal information.

6. The method according to claim 1, wherein the questions of the first set of questions are provided by the operator of the computer system.

7. The method according to claim 1, comprising:
receiving, from the poll sponsor, one or more characteristics common to a group of consumers; and
determining whether the first consumer can participate in the promotional activity based on the one or more characteristics received from the poll sponsor.

8. The method according to claim 1, comprising:
receiving, from the poll sponsor, characteristics common to a group of consumers;
identifying a particular promotion activity targeted to the group of consumers having the common characteristics; and
determining whether the first consumer can participate in the promotional activity based on the one or more characteristics received from the poll sponsor.

9. The method according to claim 1, comprising:
managing a flow and an order of operations to be performed by multiple departments of an entity corresponding to the selected promotional activity based on the information received from the poll sponsor, wherein each department is not involved in the selected promotional activity until one or more prerequisites of respective department are met and one or more respective approvals are secured.

10. The method according to claim 1, comprising:
managing a flow and an order of operations to be performed by a marketing department and an analytics department of an entity corresponding to the selected promotional activity based on the information received from the poll sponsor;
not involving the marketing department and the analytics department in the selected promotional activity until one or more prerequisites of the marketing department and the analytics department are met and one or more approvals from the marketing department and the analytics department are secured.

11. The method according to claim 1, comprising:
providing, to the poll sponsor, general information about the one or more available promotional activities;
selecting a promotional activity; and
providing, to the poll sponsor, detailed information about the selected promotional activity.

12. A non-transitory computer-readable medium having stored thereon, one or more code sections each comprising a plurality of instructions executable by at least one processor for causing the at least one processor to perform actions for operating an e-commerce promotions platform that supports automated targeted polling of a plurality of consumers, the actions comprising:
configuring, via a creation user interface, one or more graphical user interfaces for generating questions, wherein the creation user interface is configured to set for a particular question, via one or more graphical elements, a poll class, a poll category identification, a poll status, a question type, and a question format;
causing, by a selection of one or more graphical elements of a graphical user interface, the graphical user interface to filter promotional activities by question format including one or more of questions with images, questions with videos, and questions with write-in responses;
identifying, from the promotional activities supported by the e-commerce platform, one or more available promotional activities that are suitable for polling based on input from a poll sponsor;
selecting, by the poll sponsor, a promotional activity from the one or more available promotional activities;
providing a first set of questions comprising one or more questions;
receiving, from the poll sponsor, information representative of a consumer demographic, and information identifying a second set of questions comprising one or more questions chosen by the poll sponsor;
receiving, from the poll sponsor, tag information;
associating the received tag information with tags that correspond to the one or more questions chosen by the poll sponsor;
receiving a request to participate in a promotional activity supported by the at least one processor, from a communication device of a first consumer of a plurality of consumers;
in response to receiving the request to participate, selecting one or more particular questions from the second set of questions, wherein the selection of the one or more particular questions is performed according to personal information of the first consumer stored in a loyalty program and accessed by the at least one processor;
forming a third set of questions from the first set of questions and the one or more particular questions, such that the third set of questions includes the one or more particular questions;
presenting the questions of the third set of questions to the first consumer via the communication device of the first consumer;
collecting, via the communication device of the first consumer, any responses of the first consumer to the questions of the third set of questions; and
delivering, to a recipient identified to the at least one processor by the poll sponsor, responses of the first consumer to the one or more particular questions.

13. The non-transitory computer-readable medium according to claim 12, comprising determining whether the first consumer can participate in the promotion activity based on a consumer response of the first consumer to the third set of questions.

14. The non-transitory computer-readable medium according to claim 12, comprising identifying, from contests, sweepstakes, instant wins, and give-aways supported by the e-commerce platform, one or more of the contests, the sweepstakes, the instant wins, and the give-aways that are suitable for polling based on input from the poll sponsor.

15. The non-transitory computer-readable medium according to claim 12, comprising:
storing the personal information of the first consumer as part of a loyalty program of the sponsor of the promotional activity; and
selecting the one or more particular questions from the second set of questions based on the stored personal information of the loyalty program.

16. The non-transitory computer-readable medium according to claim 12, comprising:
accessing the personal information of the first consumer in response to the request to participate in the promotional activity; and
selecting the one or more particular questions from the second set of questions based on the accessed personal information.

17. The non-transitory computer-readable medium according to claim 12, wherein the questions of the first set of questions are provided by the operator of the computer system.

18. The non-transitory computer-readable medium according to claim 12, comprising:
receiving, from the poll sponsor, one or more characteristics common to a group of consumers; and
determining whether the first consumer can participate in the promotional activity based on the one or more characteristics received from the poll sponsor.

19. The non-transitory computer-readable medium according to claim 12, comprising:
receiving, from the poll sponsor, characteristics common to a group of consumers;
identifying a particular promotion activity targeted to the group of consumers having the common characteristics; and
determining whether the first consumer can participate in the promotional activity based on the one or more characteristics received from the poll sponsor.

20. A system for operating an e-commerce promotions platform that supports automated targeted polling of a plurality of consumers, the system comprising:
a computer system comprising at least one processor that, during operation, manages a promotional activity on an e-commerce platform that communicatively couples to a respective communication device of each of a plurality of users, wherein the at least one processor is operable to, at least:
configuring, via a creation user interface, one or more graphical user interfaces for generating questions, wherein the creation user interface is configured to set for a particular question, via one or more graphical elements, a poll class, a poll category identification, a poll status, a question type, and a question format;
cause, by a selection of one or more graphical elements of a graphical user interface, the graphical user interface to filter promotional activities by question format including one or more of questions with images, questions with videos, and questions with write-in responses;
identify, from the promotional activities supported by the e-commerce platform, one or more available promotional activities that are suitable for polling based on input from a poll sponsor;
select, by the poll sponsor, a promotional activity from the one or more available promotional activities;
provide a first set of questions comprising one or more questions;
receive, from the poll sponsor, information representative of a consumer demographic, and information identifying a second set of questions comprising one or more questions chosen by the poll sponsor;
receive, from the poll sponsor, tag information;
associate the received tag information with tags that correspond to the one or more questions chosen by the poll sponsor;
receive a request to participate in a promotional activity supported by the computer system, from a communication device of a first consumer of the plurality of consumers;
in response to receiving the request to participate, select one or more particular questions from the second set of questions, wherein the selection of the one or more particular questions is performed according to personal information of the first consumer stored in a loyalty program and accessed by the computer system;
form a third set of questions from the first set of questions and the one or more particular questions, such that the third set of questions includes the one or more particular questions;
present the questions of the third set of questions to the first consumer via the communication device of the first consumer;
collect, via the communication device of the first consumer, any responses of the first consumer to the questions of the third set of questions; and
deliver, to a recipient identified to the computer system by the poll sponsor, responses of the first consumer to the one or more particular questions.

21. The system according to claim 20, wherein the at least one processor is operable to determine whether the first consumer can participate in the promotion activity based on a consumer response of the first consumer to the third set of questions.

22. The system according to claim 20, wherein the at least one processor is operable to identify, from contests, sweepstakes, instant wins, and give-aways supported by the e-commerce platform, one or more of the contests, the sweepstakes, the instant wins, and the give-aways that are suitable for polling based on input from the poll sponsor.

23. The system according to claim 20, wherein the at least one processor is operable to:
store the personal information of the first consumer as part of a loyalty program of the sponsor of the promotional activity; and
select the one or more particular questions from the second set of questions based on the stored personal information of the loyalty program.

24. The system according to claim 20, wherein the at least one processor is operable to:
access the personal information of the first consumer in response to the request to participate in the promotional activity; and
select the one or more particular questions from the second set of questions based on the accessed personal information.

25. The system according to claim 20, wherein the questions of the first set of questions are provided by the operator of the computer system.

26. The system according to claim 20, wherein the at least one processor is operable to:
- receive, from the poll sponsor, one or more characteristics common to a group of consumers; and
- determine whether the first consumer can participate in the promotional activity based on the one or more characteristics received from the poll sponsor.

27. The system according to claim 20, wherein the at least one processor is operable to:
- receive, from the poll sponsor, characteristics common to a group of consumers;
- identify a particular promotion activity targeted to the group of consumers having the common characteristics; and
- determine whether the first consumer can participate in the promotional activity based on the one or more characteristics received from the poll sponsor.

\* \* \* \* \*